US007722468B2

(12) United States Patent
Cockerille et al.

(10) Patent No.: US 7,722,468 B2
(45) Date of Patent: May 25, 2010

(54) MAGNETORESISTIVE MEMORY UNITS AS READ ONLY MEMORY DEVICES IN GAMING MACHINES

(75) Inventors: Warner R. Cockerille, Sparks, NV (US); Xuedong Chen, Reno, NV (US); Nadeem A. Quraishi, Reno, NV (US); Gregory A. Schlottmann, Sparks, NV (US)

(73) Assignee: IGT, Reno, NV (US)

( * ) Notice: Subject to any disclaimer, the term of this patent is extended or adjusted under 35 U.S.C. 154(b) by 873 days.

(21) Appl. No.: 11/077,526

(22) Filed: Mar. 9, 2005

(65) Prior Publication Data

US 2006/0205515 A1 Sep. 14, 2006

(51) Int. Cl.
*G06F 17/00* (2006.01)

(52) U.S. Cl. .......................... 463/43; 463/42; 273/273; 324/207.21; 365/8; 365/158

(58) Field of Classification Search ............ 463/42–45, 463/2–8, 23, 30–32, 34, 37, 50; 273/273, 273/122 A, 119 A, 125 A, 123 A, 118 A, 273/126 A, 141 A, 142 JB, 138.2, 108.1, 273/108.3, 108.4, 317.1, 317.3, 317.4, 317.5, 273/317.6; 710/300; 360/313–319, 324–327; 324/207.21, 235, 252; 365/8, 158; 345/156–158, 345/167, 473–474, 664, 679; 715/856; *G06F 17/00*
See application file for complete search history.

(56) References Cited

U.S. PATENT DOCUMENTS 4,099,722 A 7/1978 Rodesch et al.
4,238,127 A 12/1980 Luccro et al.
4,485,457 A * 11/1984 Balaska et al. ................ 463/45

(Continued)

FOREIGN PATENT DOCUMENTS

GB 2134297 8/1984

(Continued)

OTHER PUBLICATIONS

Intel Corporation, Pentium III Processors for Applied Computing, 2001, Intel Corporation, Product Brief, pp. 1-2.*

(Continued)

*Primary Examiner*—Dmitry Suhol
*Assistant Examiner*—Arthur O. Hall
(74) *Attorney, Agent, or Firm*—Weaver Austin Villeneuve & Sampson LLP

(57) ABSTRACT

Gaming machines and systems having MRAM and MROM are disclosed. MROMs for storing boot programs and other Read Only code are formed by cutting write connections or not providing PCB socket leads to MRAM write pins, or by using memory hubs to prevent writing to MRAMs. A tale-tale board or other logging device monitoring activities at various components while primary machine power is down records to MRAM, which can be dual ported to the logging device and MGC. Various components can each have dedicated logging devices and MRAMs. One MRAM associated with the brain box replaces both DRAM and NVRAM of regular machine architectures, and is used for dual purposes of regular operational use and as safe storage to facilitate a state recovery. Prioritization of data during the storage process is rendered unnecessary. Another MRAM associated with the back plane board stores data associated with the exterior housing or terminal.

48 Claims, 9 Drawing Sheets

U.S. PATENT DOCUMENTS

| | | | | |
|---|---|---|---|---|
| 4,527,798 | A | 7/1985 | Siekierski et al. | |
| 4,582,324 | A | 4/1986 | Koza et al. | |
| 5,054,787 | A | 10/1991 | Richardson | |
| 5,173,873 | A | 12/1992 | Wu et al. | |
| 5,179,517 | A | 1/1993 | Sarbin et al. | |
| 5,224,707 | A | 7/1993 | Martin | |
| 5,357,604 | A * | 10/1994 | San et al. | 463/31 |
| 5,531,309 | A | 7/1996 | Kloss et al. | |
| 5,559,794 | A | 9/1996 | Willis et al. | |
| 5,640,343 | A | 6/1997 | Gallagher et al. | |
| 5,643,086 | A * | 7/1997 | Alcorn et al. | 463/29 |
| 5,889,933 | A | 3/1999 | Smith | |
| 5,946,227 | A | 8/1999 | Naji | |
| 6,022,274 | A * | 2/2000 | Takeda et al. | 463/44 |
| 6,104,815 | A | 8/2000 | Alcorn et al. | |
| 6,106,396 | A * | 8/2000 | Alcorn et al. | 463/29 |
| 6,142,873 | A | 11/2000 | Weiss et al. | |
| 6,149,522 | A * | 11/2000 | Alcorn et al. | 463/29 |
| 6,190,257 | B1 * | 2/2001 | Takeda et al. | 463/29 |
| 6,210,274 | B1 | 4/2001 | Carlson | |
| 6,295,577 | B1 | 9/2001 | Anderson et al. | |
| 6,364,769 | B1 * | 4/2002 | Weiss et al. | 463/29 |
| 6,401,198 | B1 * | 6/2002 | Harmer et al. | 713/1 |
| 6,462,983 | B2 | 10/2002 | Katti et al. | |
| 6,503,147 | B1 | 1/2003 | Stockdale et al. | |
| 6,511,377 | B1 | 1/2003 | Weiss | |
| 6,575,833 | B1 | 6/2003 | Stockdale | |
| 6,620,047 | B1 * | 9/2003 | Alcorn et al. | 463/37 |
| 6,625,730 | B1 * | 9/2003 | Angelo et al. | 713/2 |
| 6,646,948 | B1 * | 11/2003 | Stence et al. | 365/230.03 |
| 6,682,423 | B2 | 1/2004 | Brosnan et al. | |
| 6,722,986 | B1 * | 4/2004 | Lyons et al. | 463/29 |
| 6,734,862 | B1 | 5/2004 | Chapple et al. | |
| 6,744,662 | B2 | 6/2004 | Freitag et al. | |
| 6,775,778 | B1 * | 8/2004 | Laczko et al. | 713/194 |
| 6,798,599 | B2 * | 9/2004 | Dykes et al. | 360/69 |
| 6,804,763 | B1 | 10/2004 | Stockdale et al. | |
| 6,890,259 | B2 | 5/2005 | Breckner et al. | |
| 6,907,522 | B2 * | 6/2005 | Morais et al. | 713/2 |
| 7,107,378 | B1 * | 9/2006 | Brewer et al. | 710/300 |
| 7,155,590 | B2 * | 12/2006 | Mathis | 711/164 |
| 7,269,685 | B2 * | 9/2007 | Swanson | 711/104 |
| 7,278,068 | B1 | 10/2007 | Crowder | |
| 7,338,372 | B2 * | 3/2008 | Morrow et al. | 463/31 |
| 7,367,889 | B2 * | 5/2008 | Canterbury | 463/43 |
| 7,491,122 | B2 | 2/2009 | Ryan | |
| 7,610,462 | B2 | 10/2009 | Gagner et al. | |
| 7,618,317 | B2 | 11/2009 | Jackson | |
| RE41,092 | E * | 1/2010 | Chu | 726/2 |
| 7,676,840 | B2 * | 3/2010 | Morais et al. | 726/21 |
| 2002/0032051 | A1 | 3/2002 | Stockdale | |
| 2002/0071557 | A1 | 6/2002 | Nguyen | |
| 2002/0107067 | A1 | 8/2002 | McGlone | |
| 2002/0187826 | A1 | 12/2002 | Seymour et al. | |
| 2003/0078103 | A1 | 4/2003 | LeMay et al. | |
| 2003/0100373 | A1 | 5/2003 | Fujimoto et al. | |
| 2003/0114205 | A1 | 6/2003 | Yamashita | |
| 2003/0148807 | A1 | 8/2003 | Acres | |
| 2003/0229777 | A1 * | 12/2003 | Morais et al. | 713/2 |
| 2003/0236110 | A1 | 12/2003 | Beaulieu et al. | |
| 2004/0002381 | A1 | 1/2004 | Alcorn et al. | |
| 2004/0042112 | A1 * | 3/2004 | Stence et al. | 360/69 |
| 2004/0044849 | A1 * | 3/2004 | Stence et al. | 711/126 |
| 2004/0064647 | A1 * | 4/2004 | DeWhitt et al. | 711/135 |
| 2004/0198479 | A1 | 10/2004 | Martinek et al. | |
| 2004/0236804 | A1 | 11/2004 | Bots et al. | |
| 2005/0010738 | A1 | 1/2005 | Stockdale et al. | |
| 2006/0142977 | A1 * | 6/2006 | Oh et al. | 702/190 |
| 2006/0171196 | A1 | 8/2006 | Freitag et al. | |

FOREIGN PATENT DOCUMENTS

| | | | |
|---|---|---|---|
| WO | 2004004280 | A1 | 1/2004 |
| WO | 2004025595 | | 3/2004 |

OTHER PUBLICATIONS

Freescale Semiconductor, Inc., 256K×16-Bit 3.3-V Asynchronous Magnetoresistive RAM, Jul. 2004, Freescale Semiconductor, Inc., MR2A16A Rev. 0.1, pp. 3, 7-14.*

Brown, Brian, Hardware Systems, Part2a: Buses and Interfaces, 2000, pp. 2, 4, and 6.*

PCT International Search Report and Written Opinion from Corresponding International Application No. PCT/US2006/007951, Jul. 10, 2006, 10 pages.

PCT International Search Report and Written Opinion from Corresponding International Application No. PCT/US2006/007950, Jul. 18, 2006, 10 pages.

PCT International Search Report and Written Opinion from International Application No. PCT/US2006/008118, Nov. 13, 2006, 10 pages.

EP Communication dated Apr. 15, 2008 from EP Application No. 06 721 157.3.

Notification Concerning Transmittal of International Preliminary Report on Patentability dated Sep. 20, 2007 from PCT Application No. PCT/US2006/007951, 7 pages.

Notification Concerning Transmittal of International Preliminary Report on Patentability dated Sep. 20, 2007 from PCT Application No. PCT/US2006/008118, 8 pages.

EP Communication dated Oct. 10, 2007 from EP Application No. 06769775.5-1238, 2 pages.

Notification Concerning Transmittal of International Preliminary Report on Patentability dated Sep. 20, 2007 from PCT Application No. PCT/US2006/007950, 7 pagcs.

EP Communication from EP Application No. 06 721 156.5—2221 dated Apr. 15, 2008 , 5 pages.

Office Action from U.S. Appl. No. 11/077,517 dated Mar. 25, 2008, 37 pages.

Final Office Action from U.S. Appl. No. 11/077,517 dated Oct. 7, 2008 , 27 pages.

Office Action dated Apr. 9, 2009 from U.S. Appl. No. 11/077,253, 27 pages.

CN Communication dated Mar. 27, 2009 from CN Application No. 2006800159153.

CN Office Action dated Mar. 20, 2009 from CN Application No. 2006800140458.

Office Action dated Apr. 29, 2009 from U.S. Appl. No. 11/077,517.

CN Second Office Action mailed Nov. 6, 2009, from CN Appl. No. 200680015915.3.

CN First Office Action mailed Nov. 6, 2009, from CN Appl. No. 200680014044.3.

US Final Office Action dated Nov. 10, 2009, from U.S. Appl. No. 11/077,253.

Notice of Allowance dated Feb. 18, 2010, U.S. Appl. No. 11/077,517.

CN Office Action dated Feb. 5, 2010 from CN Application No. 200680014045.8.

* cited by examiner

MAGNETORESISTIVE MEMORY UNITS AS READ ONLY MEMORY DEVICES IN GAMING MACHINES

CROSS-REFERENCE TO RELATED APPLICATIONS

The present application is related to co-pending and commonly owned U.S. patent application Ser. Nos. 11/077,517, titled "MRAM AS CRITICAL EVENT STORAGE FOR POWERED DOWN GAMING MACHINES" and 11/077,253, titled "MRAM AS NONVOLATILE SAFE STORAGE FOR POWER HIT AND ESD TOLERANCE IN GAMING MACHINES," both of which are being filed this same day of Mar. 9, 2005 and both of which are incorporated by reference herein in their entirety and for all purposes.

TECHNICAL FIELD

The present invention relates generally to electronic gaming machines and systems, and more specifically to system architectures and memory devices within or about electronic gaming machines and systems.

BACKGROUND

Casinos and other forms of gaming comprise a growing multi-billion dollar industry that has experienced a marked shift over the past few decades to the extensive use of gaming machines, and in particular electronic and microprocessor based gaming machines. In a typical gaming machine, such as a video poker or slot machine, a game play is first initiated through a player wager of money, credit or other indicia, whereupon the gaming machine determines a game outcome, presents the game outcome to the player and then potentially dispenses an award of some type, including a monetary award, depending on the game outcome. Although this process is generally true for both mechanical and electronic gaming machines, the electronic machines tend to be more popular with players and thus more lucrative for casinos for a number of reasons, such as increased game varieties, more attractive and dynamic presentations and the ability to award larger jackpots.

Electronic gaming machines can include various hardware and software components to provide a wide variety of game types and game playing capabilities, with such hardware and software components being generally well known in the art. A typical electronic gaming machine can include hardware devices and peripherals such as, for example, bill validators, coin acceptors, card readers, keypads, buttons, levers, touch screens, coin hoppers, ticket printers, player tracking units and the like. A gaming machine can also have various audio and visual display components, such as, for example, speakers, display panels, belly and top glasses, exterior cabinet artwork, lights, and top box dioramas, as well as any number of video displays of various types to show game play and other assorted information, with such video display types including, for example, a cathode ray tube ("CRT"), a liquid crystal display ("LCD"), a light emitting diode ("LED"), a flat panel display and a plasma display, among others. Software components can include, for example, boot and initialization routines, various game play programs and subroutines, credit and payout routines, image and audio generation programs, various component modules and a random number generator, among others.

In addition, an electronic gaming machine typically includes a central processing unit ("CPU") or master gaming controller ("MGC") that controls various processes and combinations of hardware and software devices, such as components and processes that encourage game play, allow a player to play a game on the gaming machine, run the game itself, and control payouts and other awards. In addition to the many other processors within a gaming machine, this MGC or CPU in particular is associated with and can have access to a wide variety of memory or storage devices, many of which are of different types. Such memory or storage devices can include, for example, various types of random access memory ("RAM"), such as static RAM ("SRAM") dynamic RAM ("DRAM"), synchronous DRAM ("SDRAM"), battery backed and other types of non-volatile RAM ("NVRAM") and various forms of flash and cache RAM, among others, as well as numerous types of read only memory ("ROM"), such as a programmable ROM ("PROM"), including erasable PROM ("EPROM") and electrically erasable PROM ("EEPROM"), a compact disc ("CD"), a digital video disc ("DVD") and specific portions of hard drives, among others.

Instructions and other computer code for gaming machine peripherals and components are typically stored in some form of ROM by design, by regulatory requirement, or both. Many ROM devices for electronic gaming machines and their peripherals must currently be programmed externally from the gaming machine or peripheral, and then installed into the gaming machine or peripheral once they are programmed. This standard process has several major drawbacks. For one, special equipment is usually required to program the ROM devices at special programming voltages. In addition, most ROM devices cannot be reprogrammed "in circuit," and must therefore be removed from the gaming machine for any reprogramming or updating, which then usually requires some disassembly of other gaming machine components just to gain access to the ROM device. Furthermore, ROM devices must typically be completely erased prior to reprogramming, which can in itself be a time consuming process. Hence, current programming and updating parameters for many gaming machine ROM devices can be problematic or inconvenient at best.

As is generally known, many forms of ROM tend to be relatively slow in terms of access speeds, particularly with respect to many SRAM and DRAM type devices. For example, many EPROM and EEPROM type devices have access speeds on the order of about 8 to 33 MHz, while SRAM and DRAM type devices have access speeds that are typically around 133 to 800 MHz or higher. Even faster ROM devices, such as CD-ROMs and hard drives tend to run at access speeds in the vicinity of about 100 MHz, which are still significantly lower than those of many RAM type devices. Since many gaming machine programs and processes, including much or all of the initialization, authentication and other boot, startup or similarly sensitive processes, must be stored on ROM devices for a variety of reasons, such as for security purposes, these processes tend to be relatively slow in terms of the length of time taken to run with respect to the amounts of actual memory used in the processes. In fact, modern gaming machines typically load and run many resources each time that they are powered up or otherwise go through a boot process. Depending on the amount and size of the resources that must be loaded, this process tends to take upwards of several minutes to complete, with such times generally increasing as gaming machines become more sophisticated and complex.

Although the majority of the resources that are loaded do not change while the gaming machine is in use, it remains a requirement in many jurisdictions, and is still otherwise customary, to store these boot programs and other sensitive routines in the relatively slower ROM devices. In fact, many such programs and routines are copied into DRAM or some other faster storage component during the boot process, such that these programs can be accessed and operate faster as the program is first executed and/or repeatedly accessed during normal gaming machine operations. For example, most or all authentication code is currently stored in one or more EPROMs in the gaming machine. During the boot process, this authentication code is copied and loaded into gaming machine DRAM for further future use, since EPROMs are so relatively slow. Other programs and processes are similarly copied, potentially authenticated, and then stored in a relatively faster SRAM, DRAM or other storage location for future use. Although such designs are known to be standard within the gaming machine industry, it is inherently inefficient to require multiple storage units and allotments of memory space for multiple copies of the same exact programs.

While existing systems and methods for providing system architectures and memory devices in electronic gaming machines and systems have been adequate, improvements are usually welcomed and encouraged. In view of many of the above legacy features and their inherent inefficiencies, it would be desirable to have more efficient, more accessible, less complicated and yet more secure apparatuses, systems and methods of providing non-volatile memory within an electronic gaming machine.

Further, many electronic gaming machines also include some form of powered down or powered off logging, such that certain noteworthy events can be detected while the main power to the gaming machine is down or off. If provided, such events are typically recorded by a "tell-tale board" or other similar logging device that is powered by a separate battery. Such a device is usually adapted to monitor for a select few offline activities, such as the opening of the main door, bill door, drop door, brain box or card cage door and/or other critical doors or accesses of a gaming machine, such that a casino or other gaming machine operator can be notified if such events have occurred while the main power to the gaming machine has been down or off. Appropriate security measures or other action may then be taken in such cases where such critical accesses have been made during a power down or off period, as is generally known in the art.

Although useful, the overall capabilities of such tell-tale boards or logging devices can be limited due to limited power supplies for operating the logging device and maintaining the storage of any data recorded until the main power to the machine is restored. Many convenient forms of storage, such as DRAM, require a constant refresh to maintain storage, and thus tend to be quite costly and impractical in battery powered situations. DRAM tends to drain a battery over time, resulting in situations where the stability of recorded data is not guaranteed for lengthy time periods. Thus, other forms of storage tend to be used for tell-tale boards, with flash RAM being a popular choice due to its ability to hold data without constant power refreshing. Flash RAM has drawbacks too though, as it typically requires page writes, which require longer cycles and more power. Due to concerns over limited finite power supplies and the relatively large amounts of power required to monitor events and record data offline, tell-tale boards and other logging devices are typically designed only to record actual "yes" or "no" data with respect to critical offline events, with other pertinent data such as dates, times, number of occurrences and other details not being recorded. When full power is then restored to the gaming machine, it is usually only known that a given door was opened at least once during the time that power was off.

While existing systems and methods of using logging and storage devices to track and record powered down and off events in electronic gaming machines and systems have been adequate, improvements are usually welcomed and encouraged. In view of the foregoing, it would be desirable for such logging and storage devices within electronic gaming machines and systems to have more versatility, at least with respect to greater storage capacities and recording options, but without creating any expected corresponding increases in the levels of power needed for such features.

In addition, many gaming machine operators, manufacturers and gaming jurisdictions require some level of power-hit tolerance and electrostatic discharge ("ESD") tolerance in gaming machines, particularly with respect to any "safe storage" method of backing up critical gaming machine data. Such critical data can include, for example, a state and outcome of a current game, various meter readings, machine settings, logs, and so forth, some or all of which can be stored using a non-volatile memory "safe storage" device, such that stored data can be recalled whenever a malfunction, power failure, player dispute or other similar event occurs. A battery backed RAM is one an example of such a non-volatile memory "safe storage" device (i.e., NVRAM) used on many types of gaming machines for these purposes. Another possible solution for NVRAM issues is to use EEPROMs, which can maintain their memory without a constant power supply. EEPROM use does have other drawbacks though, as EEPROMs tend to have long access times, usually require software drivers to facilitate access, and can fail after tens to hundreds of thousands of writes, such that EEPROMs are generally not used as safe storage devices.

Rather, many NVRAMs designed to store critical game information for long periods of time typically require some form of battery or power backup to preserve the non-volatile nature of the device. While many such batteries are designed to last for a number of years, the need to replace any battery eventually can lead to a number of issues, including the consequences of critical lost data if such a replacement is not made in a timely manner. Also, the use of batteries as a backup source of power can severely restrict the types and amounts of memory that can be used for such purposes. As noted above, the relatively high power requirements of SRAM or DRAM make such types of units virtually impossible to use in conjunction with a battery as a practical matter. As a result, the actual storage space available for a battery backed RAM device is relatively limited. Furthermore, as in the case of many ROM devices, the access speeds for a typical battery backed RAM device are relatively slow when compared to those for SRAM, DRAM and many other RAM type devices. Also, many typical battery backed fixed memory approaches for non-volatile memory can be problematic for a variety of other reasons, such as in the instance of an open game development environment, due of security issues.

Other issues also arise with respect to the use of NVRAM as safe storage for critical gaming machine events and data. Such use of battery backed RAM or other NVRAM devices as safe storage is typically duplicative, in that the same or similar data is stored elsewhere at the gaming machine for regular gaming machine operations, such as on volatile DRAM. Of course, duplicative storage is inherently inefficient, and can sometimes cause discrepancies in instances where a recording is made at one storage device and main power is lost before an identical or similar recording is made at the other recording device. For example, a specific game state that is recorded to DRAM can occasionally be lost in the split-second that it takes to also record that specific game state to NVRAM. Recording to a safe storage device also typically involves some form of encryption or checksum process for security purposes, which can add to overall inefficiencies in the process.

In addition, multiple state related items may need to be recorded to various devices, such as permanent and transient meters within the gaming machine. For example, many electronic gaming machines are equipped with one set of meters and storage devices that are MGC or main processor board based, and another separate set of meters and storage devices that are main cabinet or physical terminal based. This distinction becomes significant where the MGC, main processor board or "brain box" contents are removed from a gaming machine and replaced with another. The former set of meters and storage devices would migrate with the outgoing components, while the latter set of meters and storage devices would remain with the "back plane" of the gutted or modified gaming machine. As noted above, using multiple devices to record the same or similar items can be inefficient, and the level of such inefficiency increasing where the number of devices and types of processes used increases.

While existing systems and methods of providing "safe storage" devices to record specific states in electronic gaming machines and systems have been adequate, improvements are usually welcomed and encouraged. In view of the foregoing, it would be desirable for such safe storage devices and techniques to involve greater storage capacities, and be more reliable and efficient, at least with respect to the number of devices used, the complexity of the various safe storage procedures used, and the reliability of gaming machine state data being stored to and recovered from both safe storage and regular use devices.

SUMMARY

It is an advantage of the present invention to provide improved hardware architectures and memory devices in electronic gaming machines and systems. This is accomplished in many embodiments by providing within or about an electronic gaming machine or system at least one magnetoresistive storage device, such as a magnetoresistive random access memory ("MRAM") and/or a magnetoresistive read only memory ("MROM"). Such items can be used to replace other memory devices in existing gaming machines, systems and architectures, and can also be used to aid in the creation of alternative gaming machine and system architectures that are more efficient than those that now exist, as noted in greater detail below. In this manner, more efficient, reliable and faster apparatuses, systems and methods for providing non-volatile memory within an electronic gaming machine can be achieved.

According to many embodiments of the present invention, the disclosed apparatuses, systems and methods involve a gaming machine or a gaming system adapted for accepting a wager, playing a game based on the wager and granting a payout based on the result of the game. These gaming machines and systems can include an MGC adapted to communicate with and possibly control other gaming machine or system components, as well as to control one or more game aspects. Many of the disclosed gaming systems can include a gaming machine, with these and other gaming machine embodiments including a display and/or an exterior housing adapted to contain internal gaming machine components therein or thereabout. Some embodiments can also include various input and output devices, such as a display for presenting game information to a player. Various machine and system embodiments can also include a memory hub to facilitate communications between different items or components, such as between the MGC and one or more memory devices.

Many embodiments of the present invention also include at least one magnetoresistive storage device of some sort, such as an MRAM and/or MROM. As in other RAM and ROM devices, MRAM typically involves a storage device that may be rewritten, while MROM typically involves a storage device that may not be rewritten. Such devices can be in communication with the MGC of the gaming machine or system, and may be primarily associated with the MGC. A primary association for an MRAM or MROM device may alternatively be with the exterior housing of the gaming machine or other physical terminal where games are presented to players, such as at a display. Such distinctions can be important where some memory devices are intended to serve a specific MGC, while others are intended to serve a specific gaming machine or gaming terminal. Communications between an MGC and various other gaming machine or system components, such as an MRAM or MROM, may be made indirectly through one or more memory hubs. In addition, the MGC itself may include a portion of MRAM or MROM in some embodiments.

In some particular embodiments, a gaming machine or gaming system can include MRAM, MROM or both. Such MROM can contain computer code regarding at least one significant gaming machine program or process, such as a specific game application, an operating system, a boot loader, a boot up process, an initialization process, an authentication process, a configuration process and a diagnostics process. In addition, at least one of the MRAM and MROM devices provided in the gaming machine or system are adapted to provide stored data or computer code to the MGC at a rate faster than 8 MHz, which is the relatively slow rate at which a current gaming machine EPROM operates. In more improved embodiments, this rate can be faster than 33 MHz, faster than 133 MHz or about 800 MHz or faster, depending upon the actual magnetoresistive storage devices and bus configurations used.

In some embodiments, at least a portion of a utilized MROM cannot be written to or have any of its code altered while installed within the gaming machine or system. This result can be obtained through a physical termination of a write connection to the unwritable and unalterable portion of the MROM, such as by cutting the write connection, which can be an ordinary write pin to the MROM or a physical lead on a printed circuit board ("PCB"). Such a physical termination can also result from the MROM being removably plugged into a socket within a PCB that does not have any appropriate connection to the write pin of the MROM, particularly a connection to any form of write device. Any such physical termination of a write connection to the MROM can made while gaming machine or system operational computer code is stored on the MROM. The above result can also be had where all or substantially all communications with the MROM are made through the memory hub, and where the MROM is rendered as unwritable and unalterable through controls at the memory hub. Such controls can prevent any communications along any write channel to the MROM during specified periods, or ever. In some embodiments, the memory hub can include an application specific integrated circuit ("ASIC").

In still further particular embodiments of the present invention, a primary power source adapted to provide power to a gaming machine or system at a level at least sufficient to accept a wager, play a game and grant a payout is provided. In addition, a "tell-tale board" or other similar logging device can be provided to record details of activities at various gaming machine components when an inadequate level of power is supplied to the gaming machine or system through the primary power source. Such an inadequate level of power can include no power at all, or can be of an amount insufficient to conduct normal gaming machine operations, such as to accept a wager, play a game and grant a payout. A specific MRAM or other similar nonvolatile low-power Random Access Memory storage device can be provided for the purpose of storing this recorded data.

In some versions, this specific MRAM or other storage device can be made accessible to both the MGC and the logging device, such as in a dual or multi-port version, while other embodiments include the specific MRAM or other storage device as being accessible only to the logging device, in which case the logging device can be adapted to provide recorded data to the MGC when an adequate level of power to the gaming machine is restored. In still other versions, each gaming machine component for which activity is recorded is associated with its own disparate logging device, each of which is in turn is associated with its own disparate nonvolatile, low-voltage Random Access Memory storage device. In any such case, the data stored on the specific MRAM or other storage device can be made available to the MGC at a rate faster than 8 MHz. In more improved versions, this rate can be faster than 33 MHz, faster than 133 MHz or about 800 MHz or faster, depending upon the actual storage devices and bus configurations used.

Various embodiments having a logging device can also include a secondary power source adapted to provide power to the logging device during powered down periods. Such a secondary power source can be a battery, a rechargeable battery, or a network cable adapted to deliver power, among other items. In addition, the logging device can be an "instant-on" device that is adapted to monitor for activity at the various gaming machine components and to power up when such activity is detected. Many gaming machine components can be included as those for which activity is recorded, with specific examples including a main door, a brain box door, a bill drop door, a bill validator, a bill dispenser, a coin hopper, a coin acceptor, a ticket printer, a touch screen, a bezel, a spectrum controller, a player tracking device and a game reel. In some embodiments, data is written to the MRAM or other storage device at a voltage lower than 4 volts, which can include a voltage ranging from about 2.7 volts to about 3.6 volts.

In another particular embodiment, a first MRAM within the gaming machine or system is configured to store gaming machine data or computer code for the dual purposes of both regular gaming machine operational use by the MGC and as safe storage to facilitate a gaming machine or system state recovery in the event of a substantial interruption to the gaming machine or system. This first MRAM can be primarily associated with the MGC, and possibly one or more other components, such as a memory hub, such that the first MRAM stays with the MGC when the MGC is removed from the gaming machine or gaming system. In addition, a second MRAM can also be included in the gaming machine or system, with this second MRAM being primarily associated with the exterior housing of a gaming machine or some other physical component of a terminal within a gaming system, such as a display. This second MRAM can be configured to store auxiliary gaming machine data or computer code for gaming associated with the exterior housing or other physical terminal regardless of whether the MGC is also so associated. Both the first MRAM and second MRAM can be in communication with the MGC, which communication may be made indirectly through a memory hub.

Detailed versions of this embodiment can further include a "brain box" removable from the exterior housing of the gaming machine or physical terminal of a gaming system, as well as a "back plane board" that is adapted to remain with the exterior housing or physical terminal when the brain box is removed. In such detailed versions, the brain box can contain the MGC, a memory hub and the first MRAM, while the back plane board can contain the second MRAM. In addition, the gaming machine or system can be adapted to update the data or code stored on the second housing or terminal based MRAM after every play at the gaming machine or the system terminal. Alternatively, such updates could be made after every other game play, every third game play and so forth, where the update frequency occurs more often than is presently done in the industry, such as after every 100 game plays.

Various other specific embodiments involve methods of operating a gaming machine or system. One such method includes effecting a power up or other reset condition of the gaming machine or system, detecting stored computer code for a program or process at a ROM associated with the gaming machine or gaming system, reading that stored computer code from the ROM at a rate faster than 8 MHz, and conducting a gaming machine process based only upon a reading of the stored computer code from that ROM and not any other copy from another storage device. Of course, the ROM can be an MROM, and the reading rate can be at faster rates, as noted above. The method can include not creating a copy of the stored computer code in any other memory device, at least for purposes of conducting the gaming machine process. The method can also include authenticating the stored computer code, which can involve creating a copy of the code at another storage device for authentication purposes only. The reading of the stored computer code can be made from the ROM into an MGC of the gaming machine or gaming system, and may involve no reading of any copy of the stored computer code into the MGC from any other storage device. The gaming machine or system process may be a boot process, or can be any of a number of other processes, as listed below.

Further specific embodiments of methods of operating a gaming machine or system can include detecting the occurrence of a critical event affecting a state of the gaming machine or system, storing data relating to the detected critical event at a given storage device, asserting a specific state of the gaming machine or system based on this stored data, reading this stored data from the storage device, conducting a regular gaming machine or system operation based upon this reading of the stored data, experiencing a substantial interruption to regular gaming machine or system operations, subsequently rereading the stored data from the same storage device, and then reasserting the previous specific state of the gaming machine or system based upon this rereading of the stored data. In such methods, the asserting and reasserting steps can include displaying data regarding at least a portion of the specific state at a display of the gaming machine or system. An additional step can be establishing a stable power input to the gaming machine or system and stable communications within the gaming machine or system after the experiencing step.

Still further specific embodiments of methods of operating a gaming machine or system can include experiencing a period during which an inadequate level of power is provided through a primary power source to the gaming machine, detecting activity at one or more gaming machine components during such a powered down period, recording data for various details of such detected activities to a MRAM or other nonvolatile, low-voltage Random Access Memory storage device during the powered down period, later establishing an adequate level of power to the gaming machine through the primary power source, and later communicating the recorded data to the master gaming controller of the gaming machine at a relatively fast rate, such as 33 MHz or faster. Additional steps can include providing power to a logging device from a secondary power source and monitoring for activity at the various gaming machine components during the powered down period, as well as providing an increased level of power to the logging device from the secondary power source when activity is detected at one of the monitored gaming machine components.

Various detailed versions of any of the foregoing embodiments may also include further specific elements. For example, a gaming system can also include a physical terminal adapted to present gaming results to a player of the gaming system. Such a gaming terminal can include a gaming machine, a display and/or some other physical item. In addition, all or part of an MRAM can be a singular replacement for both DRAM and NVRAM in a regular gaming machine or system architecture. Other details can include all or part of the gaming machine or system data or computer code stored on an MRAM not being stored at any gaming machine or system component other than the MRAM, as well as only one or alternatively multiple copies of that data or computer code being stored on that MRAM. Such gaming machine or system data or computer code stored on an MRAM can include data regarding a gaming machine or system state, and such data regarding a gaming machine or system state can be stored on the MRAM without prioritizing any of the data during the storage process.

Further detailed versions of any of the foregoing embodiments can include specifics for several of the foregoing items. For example, a substantial interruption or reset to the gaming machine or system can involve a power outage, a substantial electrostatic discharge, a reset, a critical hardware malfunction, a critical software malfunction, a tilt and physical damage to a critical component, any of which may apply to a single gaming machine, an entire gaming system or a significant portion thereof. A critical event can include a coin in, a bill in, a cashless instrument in, a meter change, a game selection, a player input, a partial game outcome, a complete game outcome, a coin out, and a cashless instrument out. Regular gaming machine or system operations can include various actions involving a meter change, a meter display, a game selection, a game play, a partial game outcome, a complete game outcome, a game display, a coin out, a cashless instrument out, a machine yield calculation, an informational display and a data communication.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing magnetoresistive memory units within a gaming machine or gaming system. These drawings in no way limit any changes in form and detail that may be made to the invention by one skilled in the art without departing from the spirit and scope of the invention.

DETAILED DESCRIPTION

Figure 1:
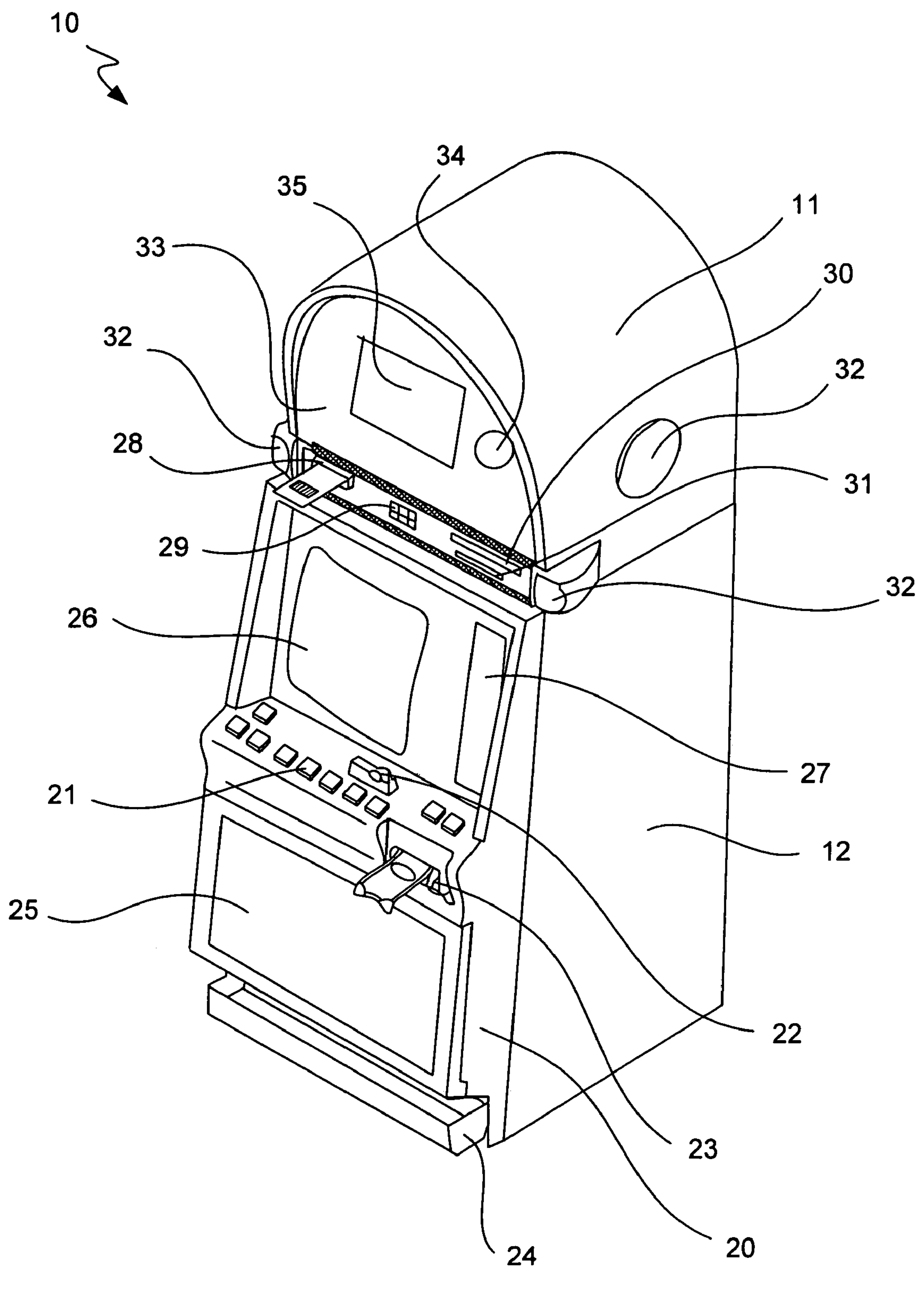
FIG. 1 illustrates in perspective view an exemplary gaming machine.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

One advantage of the present invention is the introduction of relatively fast yet reliable ROM within a gaming machine or system. This is accomplished in part by using one or more magnetoresistive storage devices that are adapted to be read only devices (i.e., MROMs). In some embodiments, a form of conventional MRAM is modified such that its write ability is physically disabled or otherwise terminated, while in other embodiments the write ability to such MRAM devices is controlled by another device and is maintained in a no-write configuration at most or all times.

Another advantage of the disclosed apparatuses, systems and methods is the provision of more versatile powered down logging devices and higher capacity storage devices within a gaming machine or system. This is accomplished in part by utilizing one or more MRAM devices adapted to store the same or more data at the same or lower power consumption levels of traditional tell-tale board storage devices. In some embodiments, these MRAMs can be dual ported to both the logging device and the MGC or other primary processor, and in other embodiments, a variety of "smart" gaming machine components can each have their own dedicated logging device and MRAM to track offline events.

Yet another advantage of the present invention is the ability to provide more efficient and reliable safe storage devices for recording state information in the event of a power hit or other gaming machine or system malfunction. Rather than operate with two different copies or versions of the same information in speedy but volatile DRAM and slower but nonvolatile battery backed RAM or other NVRAM, one copy of information can be provided for both regular gaming machine operations and safe storage in speedy and nonvolatile MRAM. Such a modified use can reduce the number of devices and complexity of processes used significantly, and can also result in the elimination of any need for prioritizing data to be stored in an otherwise limited amount of NVRAM. Of course, the nonvolatile, reliable, low power and relatively fast nature of most forms of MRAM can be beneficial in many of these specific and other applications within a gaming machine or system.

Although the present invention is directed primarily to gaming machines and systems, it is worth noting that some of the apparatuses, systems and methods disclosed herein might be adaptable for use in other types of devices or environments, such that their use is not restricted exclusively to gaming machines and contexts. Such other adaptations may become readily apparent upon review of the inventive devices, systems and methods illustrated and discussed herein. The remainder of the detailed description herein first provides general discussions of gaming machines, gaming machine architectures and conventional MRAM devices. Following that, specific embodiments of specialized gaming machines having alternative gaming machine architectures are provided, after which various methods of use for such gaming machines and gaming systems are provided. Finally, exemplary network and system configurations are given.

Gaming Machines

Referring first to FIG. 1, an exemplary gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket printer 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Other features and functions may also be used in association with gaming machine 10, and it is specifically contemplated that the present invention can be used in conjunction with such a gaming machine or device that might encompass any or all such additional types of features and functions. Gaming machines such as these and other variations and types are made by many manufacturers, such as, for example, IGT of Reno, Nev.

With respect to electronic gaming machines in particular, the electronic gaming machines made by IGT are provided with special features and additional circuitry that differentiate them from general-purpose computers, such as a laptop or desktop personal computer. Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. Descriptions and examples of current gaming machine architectures can be found in a variety of references, and various discussions of hardware and software structures for an electronic gaming machine are disclosed in, for example, commonly assigned U.S. Pat. No. 6,804,763 by Stockdale, et al., entitled "High Performance Battery Backed RAM Interface;" as well as commonly assigned and co-pending U.S. patent application Ser. Nos. 10/040,239, by LeMay, et al., entitled "Game Development Architecture That Decouples The Game Logic From The Graphics Logic;" and 10/041,242, by Breckner, et al., entitled "Decoupling Of The Graphical Presentation Of A Game From The Presentation Logic," each of which is incorporated herein in its entirety and for all purposes. A general description of many specializations in electronic gaming machines relative to general-purpose computing machines and specific examples of additional or different components and features found in such electronic gaming machines now follows.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history or "state" information can include information regarding the amount of credits on the machine, the state of any game in progress, data regarding previous games played, amounts wagered, and so forth, any or all of which can be stored in a non-volatile memory device. This feature allows the state of the gaming machine to be recovered in the event of a substantial interruption to the gaming machine, which can include a power outage, a gaming machine reset, a critical hardware malfunction, a critical software malfunction and a gaming machine functional tilt, among other items, as will be readily appreciated. This is critical to ensure that correct wagers, credits and other important informational items are preserved.

Typically, battery backed RAM devices or other similar components are used to preserve this critical data. These memory devices are not used in typical general-purpose computers. Also, the software structure on the gaming machine can include a safe storage manager module that is configured to update the overall state of the gaming machine to the non-volatile storage component or components, preferably on a recurring basis. This safe storage manager can also be configured to restore the gaming machine to a part or all of the overall state stored at a non-volatile storage component. Further details of state based storage and recovery processes in a gaming machine are disclosed in commonly assigned U.S. Pat. No. 6,804,763, which is again incorporated herein by reference in its entirety and for all purposes.

In addition, substantial interruptions to the gaming machine are typically monitored for by one or more system managers, such as, for example, a tilt manager. Machine properties such as power level, temperature, electrostatic level and other factors are monitored, and cautionary signals or tilt generation instructions are sent and acted upon as appropriate when one or more of these properties of the gaming machine crosses a set tolerance level for whatever reason. Details of such property monitoring and tilt generation processes in a gaming machine are disclosed in commonly assigned and co-pending U.S. patent application Ser. No. 09/954,816, by Breckner, et al., entitled "Modular Tilt Handling System," which is incorporated herein by reference in its entirety and for all purposes.

Continuing further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general purpose computers.

Gaming Machine Architecture

Figure 2:
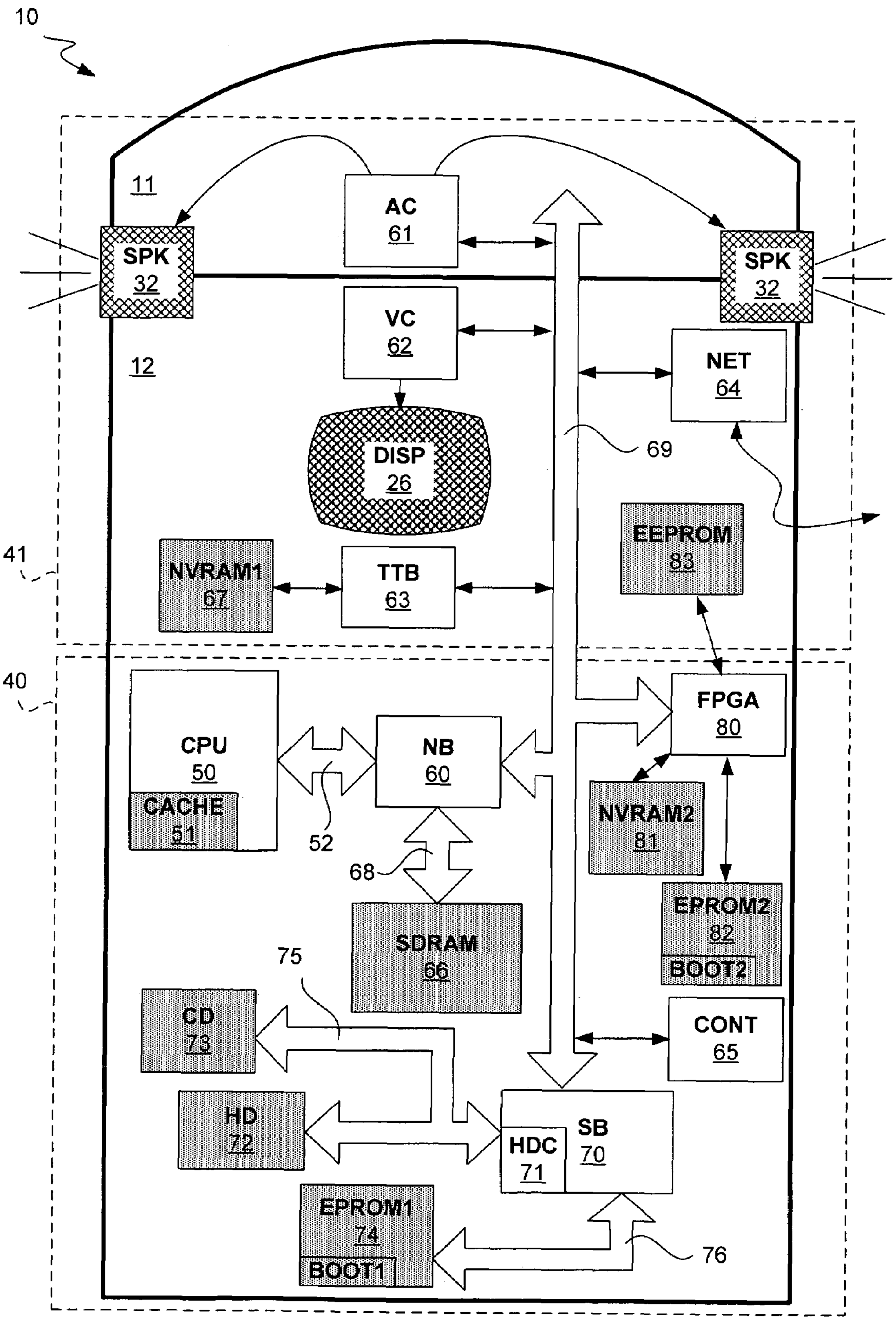
FIG. 2 illustrates in block diagram format one exemplary partial hardware architecture for the gaming machine of FIG. 1.

Moving next to FIG. 2, a partial exemplary architecture for the electronic gaming machine of FIG. 1 is illustrated in block diagram format. Although it may be appreciated that this architecture resembles a PC architecture in some ways, there remain various nuances that can be peculiar to such a gaming machine architecture. It will also be appreciated that the various architectural items illustrated represent only a portion of the many possible architectural elements of a gaming machine, that many other such items may also be included and/or substituted for those shown, and that not every item shown must be included. It is also understood that a wide variety of makes and models of hardware components can be used for a given item, and that any such suitable components are contemplated for use in the present invention. It will be further understood that the various items shown are provided for purposes of illustration only, need not be in the particular locations or arrangements shown, much less present at all in a given gaming machine. For example, while primary display 26 is generally at or near the center of the front face of the gaming machine and speakers 32 are located at the gaming machine sides where the top box meets the main cabinet, one or more of these items may be alternatively placed in a variety of other locations or relative arrangements.

As is also shown in FIG. 1, gaming machine 10 generally includes a top box 11 and main cabinet 12. CPU 50, which is preferably the gaming machine MGC or a portion thereof, executes the logic provided by gaming software on the gaming machine or system. Such a CPU can be, for example, a Pentium series processor available from Intel Corporation of Santa Clara, Calif. or a K6 series processor available from AMD Corporation of Sunnyvale, Calif., among others. To increase the performance of this MGC or CPU, data and instructions may be stored in a memory cache 51 directly on the CPU 50 or at some other relatively convenient location (not shown), such as one that might be located directly off of CPU bus 52, for example. For applications with critical data storage requirements, such memory caches are not usually utilized for critical data storage, since data stored in these locations may be lost in the event of a power failure. Thus, a separate non-volatile memory storage device is utilized, such as NVRAM2 81, as detailed further below.

A north bridge 60 is provided essentially as a memory hub adapted to facilitate and convert communications between various signals, such as, for example, CPU bus signals, Peripheral Component Interface ("PCI") bus signals, and memory bus signals, among others. One example of such another signal can be advanced graphic port ("AGP") signals, if applicable. Signals for the CPU bus 52, PCI bus 69, memory bus 68, AGP (not shown) and others may differ according to the voltage level, clock rate and bit width. Also, the format of appropriate control signals on each type conduit such as read strobe, write strobe, ready signal for timing, address signals and data signals may vary from conduit to conduit. North bridge 60, which can be any suitable form of suitable memory hub, such as, for example, an ASIC or Field Programmable Gate Array ("FPGA"), among others, enables communications between these and other different types of conduits. For instance, the PCI standard is a well-defined standard used in the personal computer industry, and is maintained by the Peripheral Component Interface Special Interest Group ("PCISIG") of Portland, Oreg., further information for which can be found at http://www.pcisig.com. PCI version 2.1 typically uses a 66 MHz clock rate and a 32 bit wide data signal at 5 volts to send signals. Other versions of PCI using a 133 MHz clock rate and/or a 64 bit wide data signal may also be available. In contrast, the clock rate used to send data signals on or "speed" of CPU bus 52 may be much higher, such as at or above 800 MHz, as will be readily appreciated.

One or more SDRAM units 66 may store various data and items, such as the gaming machine software to be executed by the CPU 50. As is generally known, such gaming machine software generally provides and allows a game to be played on the gaming machine. SDRAM 66 can be in communication with the CPU indirectly via north bridge 60, and with the north bridge directly via a memory bus 68 or other similar communication link. As is generally known in the art, such a memory bus can be relatively fast, operating at a clock rate of at or above 800 MHz, for example. SDRAM 66 can be the primary form of storage used by the gaming machine for high speed data storage and processing during regular gaming machine operations. It will also be readily appreciated that while SDRAM 66 is relatively fast, it is generally a volatile form of memory, and as such must typically be refreshed or restored upon any new gaming machine power up or reset, such as by loading software from a more stable source, such as, for example, a relatively slower hard drive 72 or CD-ROM 73.

North bridge 60 also preferably connects to a wide variety of gaming machine components, peripherals and additional memory hubs via PCI bus 69. Keyboards, printers, audio components, video components, touch screens, player tracking units, coin acceptors, bill validators, network components and the like are all examples of devices that may communicate with CPU 50 via the PCI bus 69. It will be readily appreciated that while several specific examples of PCI bus devices and components are illustrated and discussed as follows, that many more may also be present and connected to the PCI bus of a gaming machine. As one example, an audio controller 61, which may send signals to one or more speakers or other sound projection devices 32, can be connected to PCI bus 69. Video controller 62 may also be so connected, and can be used to send signals to one or more displays connected to the gaming machine, such as primary display 26, such that a game outcome may be presented to a player playing a game on the gaming machine. Video controller 62 might be installed as part of a video card that includes video memory and a separate video processor. Using the CPU 50, audio controller 61 and video controller 62, high-quality graphics, sound and multimedia presentations may be presented as part of a game play, outcome or other presentation.

A tell-tale board 63 adapted to detect and record various events when the main power to gaming machine 10 is down or completely off can also connect to PCI bus 69. Such events can be recorded to NVRAM1 67, which can be some form of battery backed RAM or flash RAM, for example. As noted above, tell-tale board 63 can be battery powered, and in any event should at least be adapted to receive power from a source other than the main power source (not shown) of the gaming machine. Such a secondary power source becomes necessary if the tell-tale board is to perform its primary function of recording critical event information while the main power is down or off. As also noted above, such recorded events can be, for example, a notice that a main door has been opened, a bill door has been opened, and/or a card cage or "brain box" door has been opened, among others. A network controller 64, which may communicate with one or more networks including a casino local area network ("LAN") or a wide area network ("WAN") can also be connected to PCI bus 69. Such a network controller 64 may allow the gaming machine to communicate with devices that provide gaming services, such as an accounting server and a wide area progressive server, among others. The accounting server may poll the gaming machine for accounting information stored in a non-volatile memory storage device, such as NVRAM2 81. The wide area progressive server may receive information stored in NVRAM2 81, such as wagers made on the gaming machine, and may also send information to be stored in an NVRAM, such as the value of a progressive jackpot. A generic controller 65 is also shown as being connected to PCI bus 69, with such a controller representing any of the numerous other controllers or devices that can also be connected to the PCI bus. Controller 65 could be, for example, a player tracking unit, keyboard, ticket printer, coin acceptor, bill validator, coin hopper or any of various inputs, such as a touch screen or button, for example.

One or more additional information or memory hubs may also be linked along PCI bus 69, such as, for example, a south bridge 70. This south bridge 70 may also separately connect to various additional memory devices, as well as one or more serial ports (not shown), such as those for a bill validator. In one particular example, when a monetary bill, printed ticket or other acceptable indicia of credit is accepted by the bill validator, information regarding the denomination of the bill or value of the ticket or other indicia may be transferred serially using a Netplex interface to the south bridge 70, with Netplex being an IGT proprietary protocol. Such Netplex serial signals can then be converted to PCI standard signals by the south bridge 70 using a Netplex device driver. Other suitable non-proprietary methods of communication, such as those under the RS-232 serial standard, may also be used. The information transferred from the bill validator might be treated as critical game information, whereby non-volatile memory storage such as NVRAM2 81 might be used.

South bridge 70 may contain various components internally, such as a hard drive controller 71, and can be used to connect various stable ROM storage devices to the system, such as hard drive 72, CD-ROM 73 and EPROM1 74, among others. Some of these devices, such as hard drive 72 and CD-ROM 73 can connect to the south bridge 70 via an integrated drive electronics ("IDE") bus 75 or other similar connection. As is known in the art, a typical IDE bus operates at a speed of about 100 MHz, which is generally appropriate for the access rates of many hard drives and CD-ROM drives. Other devices, such as EPROM1 74, can connect to the south bridge 70 via a basic industry standard architecture ("ISA") bus 76, which can be relatively slow in comparison to other buses and connections. For example, a typical ISA bus might transmit data at a speed of about 8 MHz, which would be appropriate for an EPROM and other similarly slower components. In many gaming machines, the boot programs used in a power up or restart process tend to be in multiple locations, such as an initial basic input/output system ("BIOS") at a "BOOT 1" location within EPROM1 74 and an extended BIOS at a "BOOT2" location within EPROM2 82, as discussed in greater detail below. Other components might also connect to south bridge 70 by a universal serial bus ("USB") (not shown) and/or any of a number of other suitable buses and connections, as will be readily appreciated.

Additional components and storage devices can also be connected to the PCI bus 69 as part of a gaming system extension, such as through an FPGA 80 or another similar logic device or memory hub. FPGA 80 can be, for example, a model XC3S50 FPGA manufactured by Xilinx, Inc. of San Jose, Calif. Alternatively, such a gaming system extension can be another PCI interface device, such as the PLX 9050 made by PLX Technology of Sunnyvale, Calif. Of course, any other similarly suitable device can also be used as a gaming system extension. This FPGA 80 or other gaming system extension can include various serial connections that allow communication with several devices, such as player tracking units, wide are progressive systems and casino area networks, among others. Memory units that connect to the PCI bus 69 through FPGA 80 or another similar extension can include, for example, a battery backed RAM or other non-volatile memory unit NVRAM2 81, a boot related memory unit EPROM2 82, and a "black box" EEPROM 83 for storing data and other gaming machine specific information, among others. Of course, multiple FPGAs or other similar extension devices may also connect to PCI bus 69, although only one is illustrated here for purposes of simplicity and discussion.

One use for battery backed RAM or otherwise non-volatile NVRAM2 81 is to preserve a game history or state of the gaming machine, as noted above. Such a gaming machine history or state can include many details and data items regarding information from a game presentation and/or outcome, as noted above, including one or more frames from a sequence of frames used in the game outcome or presentation. Such frames may be copied to NVRAM2 81 from frame buffers residing on the video controller 62 or at another location in the gaming machine. As such, NVRAM2 81 is a "safe storage" device for gaming machine 10, and can be connected to PCI bus 69 for a number of reasons. For one, the PCI bus 69 allows for a relatively fast connection (e.g., 66 or 133 MHz) to the CPU 50 from NVRAM2 81 (via FPGA 80, north bridge 60 and the faster CPU bus 52). Such a speedy connection is important, since the software typically does not advance to the next state until the current state is executed or rolled back in a state based transaction system. Execution of each state involves a number of access requests to NVRAM2 81, such that the access rate to this device typically affects the performance of the entire gaming machine or system. Although a faster connection than PCI bus 69 might be desirable, the speed of this bus tends to be on par with the speed of many typical battery backed RAM devices, such that a faster bus would not provide any significant advantage when used with NVRAM2 81.

Other reasons for using a PCI bus in association with NVRAM2 81 or other battery backed RAM can include the fact that there is typically no data caching on a PCI bus, which is an important feature where critical data is being backed up, as well as the ability for items on a PCI bus to be interchangeable and to be tolerant of changes on a main processor board, such as a CPU swap. This permits flexibility in swapping out various gaming machine components without having to make any corresponding changes to the NVRAM2 81 for purposes of compatibility. It is preferable that a gaming machine safe storage component, such as NVRAM2 81, be relatively large, given its critical function of backing up states in a gaming machine. Such an inclusion or use of a large non-volatile memory is usually not a standard component on a PC, thus distinguishing PCs from gaming machines at least in this regard. Further details of safe storage at an NVRAM device are disclosed in the previously noted commonly assigned U.S. Pat. No. 6,804,763 by Stockdale, et al., entitled "High Performance Battery Backed RAM Interface," which has been incorporated by reference herein in its entirety and for all purposes.

One use for a one time writable ROM such as EPROM2 82 can be that of storage for critical extended BIOS ("BOOT2"), as noted above. In a typical boot up or reset process, the gaming machine is initially directed to the initial BIOS program stored at BOOT1 within the EPROM1 74 connected to south bridge 70. Once this has been booted and acted upon, logic within the BOOT1 direct the gaming machine to the extended BIOS program stored at BOOT2 within the EPROM2 82 connected to FPGA 80. As will be readily appreciated, both of these processes can involve various boot, loading, decryption, authentication and verification processes, and any of a number of suitable encryption techniques can employed during these processes. For example, a public-key encryption can involve a combination of a private key that is known only to a single host device and a public-key that is given to any other device that wants to communicate securely with the host device. A sending device encrypts a document using the public key from the recipient and its own private key. The receiving device uses the public-key (as provided by the other device) and its own private key to decode the encrypted message. Files may also be authenticated using digital signatures or digital certificates created via the private key of the sender. Such digital certificates permit the recipient to confirm the identity of the sender, as is generally known in the art. Further details on methods and systems for encryption, hashing and other authentication tools in a gaming machine can be found in, for example, commonly owned U.S. Pat. Nos. 5,643,086; 6,104,815; 6,106,396; 6,149,522 and 6,620,047, as well as U.S. Patent Publication No. 2004/0002381, all of which are incorporated by reference herein in their entirety and for all purposes.

Uses for a "black box" non-volatile RAM device, such as EEPROM 83, can be for storing data specific to the exterior cabinet or physical terminal of a gaming machine or system. Such data can be overall cabinet or terminal based meter data, backup data or code for other gaming machine or system components, and/or other gaming machine or terminal specific information, such as country designations, accounting denominations, machine yield data, progressive jackpot data, volume settings and overall gaming machine configuration data, among others. The need for such overall EEPROMs or other like storage devices typically arises due to gaming regulations, gaming operator desire to track overall data with respect to a machine housing or physical terminal, or both. As such, this "black box" EEPROM 83 can be located on a back plane board of the gaming machine, such that it remains with the exterior housing when the main processor board or "brain box" and/or its associated components are replaced. As is generally known, a "brain box" is typically a sheet metal enclosure within the gaming machine that is adapted to house a number of critical components, such as the MGC or CPU, as well as various memory devices, such as some RAM, NVRAM, the hard drive, and other such components. This brain box can come with a lock, and may be removable from the gaming machine as an entire unit in some cases. EEPROM 83 can then be interfaced to the new "brain box" and/or other components that are newly installed, as will be readily appreciated.

Referring again to FIG. 2, designations for those items that are primarily associated with the main processor board or "brain box," such that they are typically removed from the gaming machine along with the brain box when it is replaced, are shown as being within brain box region 40. Conversely, those gaming machine items that are primarily associated with the gaming machine exterior housing, such that they remain with the exterior housing while the main processor board is replaced, are seen as being within back plane board region 41. As shown, replacement of a main processor board typically involves the replacement of CPU 50, its cache 51, north bridge 60, SDRAM 66, south bridge 70, hard drive 72, CD-ROM 73, EPROM1 74, FPGA 80, NVRAM2 81, EPROM2 82 and possibly one or more other components, such as generic controller 65. Items that usually remain with the cabinet or exterior housing during a brain box swap can include the "black box" EEPROM 83, as well as audio controller 61 and speakers 32, video controller 62 and main display 26, tell-tale board 63 and its associated NVRAM1 67, and network controller 64, among others.

Figure 3:
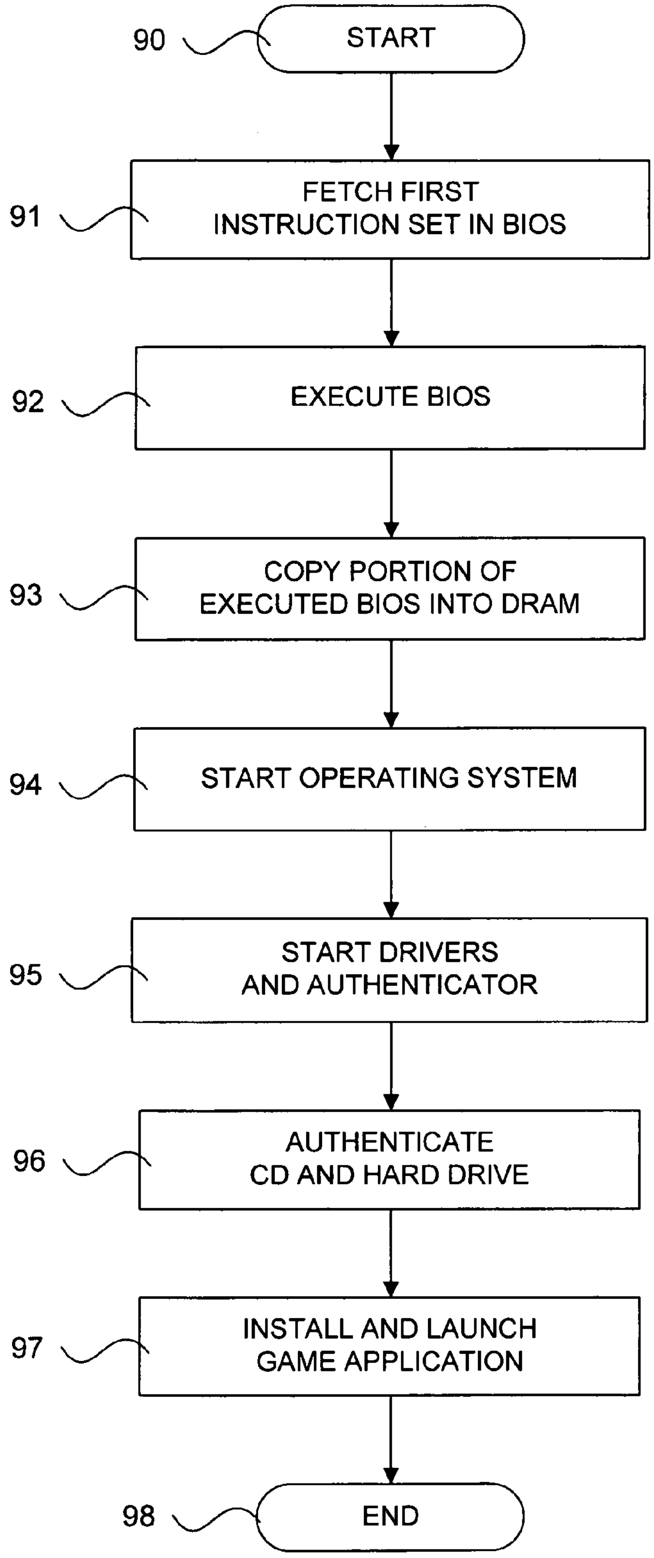
FIG. 3 illustrates a flowchart of one exemplary method of starting or rebooting the gaming machine of FIG. 1.

Continuing on to FIG. 3, a flowchart of one exemplary method of starting or rebooting the gaming machine of FIGS. 1 and 2 is provided. It will be understood that not every step provided for such a start or reboot process is necessary, that other steps might be included, and that the order of steps might be rearranged as desired for a given application. After a start step 90, a first set of instructions is fetched from a main BIOS at process step 91. Such a main BIOS can be that which is found at the BOOT1 code within EPROM1 74 of gaming machine 10. This main BIOS is then executed at a following process step 92, and a copy of at least a portion of the main BIOS is then made to a faster memory location at process step 93, such as SDRAM 66 of gaming machine 10. The operating system of the gaming machine is started at process step 94, after which appropriate drivers and an authenticator are started at process step 95. Authentication of various components, such as the hard drive and CD-ROM, occurs at process step 96. At process step 97, a game application is installed and launched, after which the boot process ends at an end step 98.

MRAM Devices

Many conventional writable memory devices, such as SRAM, DRAM, SDRAM, NVRAM, Flash RAM, EEPROMs and the like, tend to suffer from one or more drawbacks that render them as less than ideal. For example, while SRAM tends to have fast access times, it is a volatile form of low density memory that loses its storage in the event of a power outage. DRAM is similar in that it is relatively fast, but volatile, and also requires constant power for memory refreshing. Furthermore, while Flash RAM and EEPROMs are indeed nonvolatile, they are both low density and have slow access times. In addition, higher voltage levels are typically required to write to Flash RAM, and EEPROMs typically require custom software drivers. Conversely, magnetoresistive random access memory (i.e., MRAM) is an alternative form of memory storage that is nonvolatile, high density, does not require refreshing, can be written to at low voltages, does not require custom software drivers, and has relatively fast access times that can approach the speeds of SRAM in some cases.

With respect to many of the gaming machine issues and memory devices noted above then, MRAM is much faster than Flash RAM, EEPROMs or EPROMs, and is nearly as fast as volatile RAM. Accordingly, use of MRAM in place of most typical boot storage devices can significantly decrease the amount of time that it takes to start or reboot a gaming machine. MRAM is also non-volatile without requiring a battery or other power source, thus making it advantageous over any other NVRAM. It also does not require any special driver to use, thus rendering it advantageous over any memory device that does. MRAM has several advantages over DRAM, since it is non-volatile, does not need to be constantly refreshed, and can be at least as fast as DRAM. Since MRAM is faster than any other form of NVRAM, this also narrows or eliminates the window in which data can be lost before it is backed up to safe storage, in the event that MRAM is used as a safe storage device. It is also worth noting that MRAM is particularly reliable in retaining its data for long periods of time without any power, since it uses magnetic principles rather than electrical power to store data.

MRAM is a relatively new technology, and typically involves cell type storage based on a transistor and magnetic tunnel junction ("MTJ") structure. As is generally known in the art, an MTJ structure can be comprised of a layer of insulating material situated between two electrodes of a magnetic material. One electrode can be a fixed ferromagnetic layer that creates a strong pinning field to hold the magnetic polarization of the layer in a particular given direction. The other electrode can then be another ferromagnetic layer that is able to rotate and hold its magnetic polarization in a plurality of directions, preferably at least two magnetically opposite directions. When the pinned and rotatable electrodes have the same polarization, the MTJ cell will be in a low resistance state; and when the electrodes have an opposite or substantially different polarization, the MTJ cell will be in a high resistance state. A current can then be made to "tunnel" from one magnetic layer to the other magnetic layer through the insulator, whereby the resistance state of a given MTJ cell can be detected. Various details of MTJ structures and of MRAM in general can be found in many references, such as, for example, U.S. Pat. Nos. 5,173,873; 5,640,343; and 6,744,662, each of which is incorporated by reference herein in its entirety, as well as at various web site pages several MRAM developers, such as www.freescale.com and www.research.ibm.com, among others.

Specific examples of MRAM storage devices that can be used in a gaming machine or system can include the MR2A16A model 4 Mb MRAM unit now being offered by Freescale Semiconductor Inc. of Austin, Tex., or the 16 Mb MRAM unit that was recently demonstrated by Infineon Technologies AG of Munich, Germany. Other developers that have or are expected to make MRAM units commercially available soon also include IBM of Armonk, N.Y., Hewlett Packard of Palo Alto, Calif., Motorola of Schaumburg, Ill. and Cypress Semiconductor of San Jose, Calif., among others. It is specifically contemplated that these or any other suitable MRAM unit made by any provider can be used in a gaming machine or system under the present invention, as disclosed herein. In fact, it is specifically contemplated that any form of MRAM can be used as a replacement for any other form of memory in an electronic gaming machine or system. Such a replacement or replacements can in some cases effecting a significant restructuring of a gaming machine architecture, as set forth in further detail below.

Specialized Gaming Devices

Figure 4:
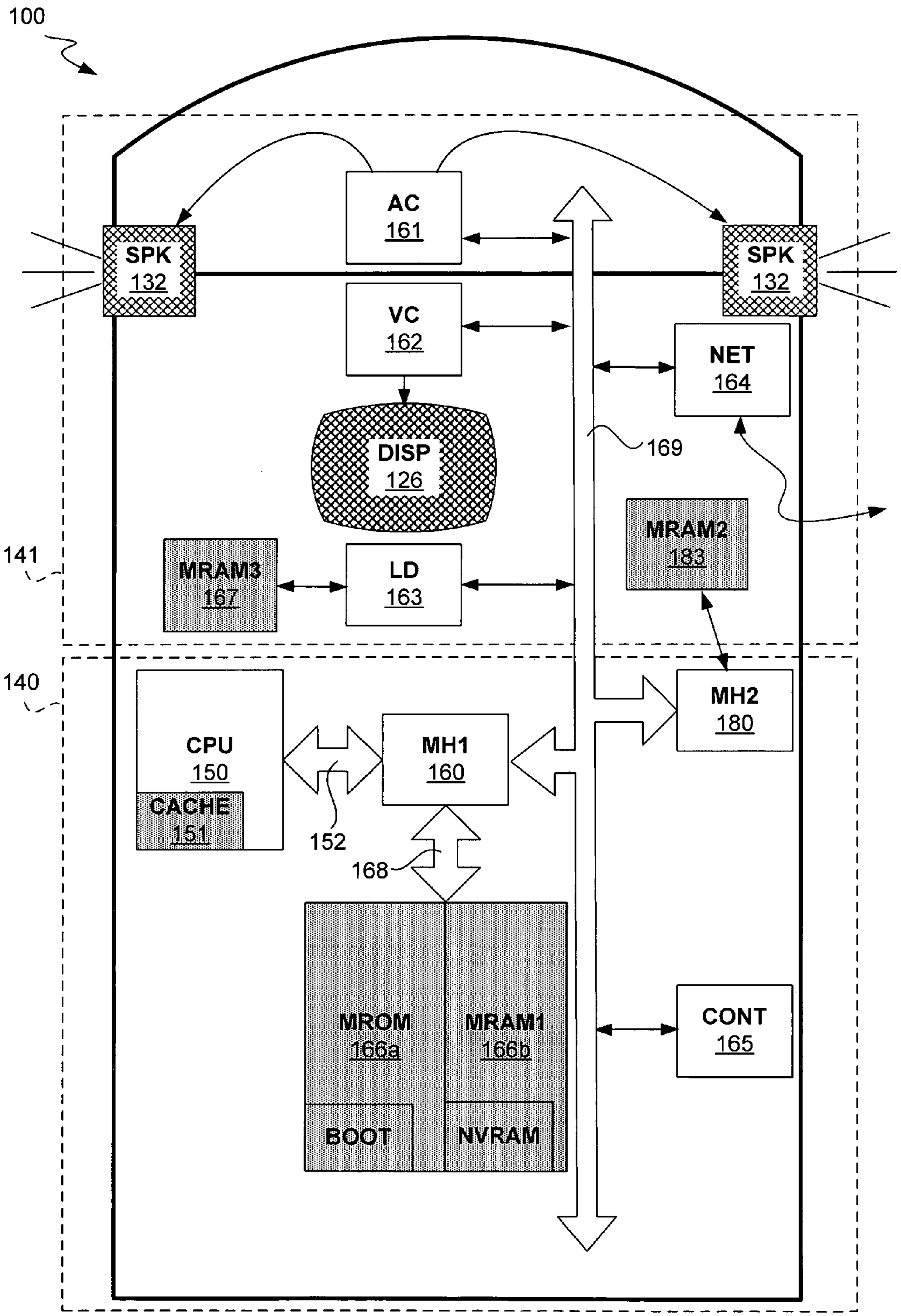
FIG. 4 illustrates in block diagram format one exemplary partial hardware architecture for a specialized gaming machine having magnetoresistive storage devices according to one embodiment of the present invention.

Turning now to FIG. 4, a block diagram of an exemplary partial hardware architecture for a specialized gaming machine having magnetoresistive storage devices according to one embodiment of the present invention is illustrated. Gaming machine 100 is similar to gaming machine 10 in outward appearance, having a top box, main cabinet, primary display 126, speakers 132 and various other components that can be identical or similar to those found in or on gaming machine 10. Other components can also be identical or similar, including the audio controller 161, video controller 162, network controller 164, generic controller 165, CPU 150 and its incorporated cache 151, CPU bus 152, memory bus 168 and PCI bus 169, among others. There are several significant differences between gaming machines, however, notably the use of MRAM and MROM units and the elimination of several other devices in specialized gaming machine 100.

It can be seen from FIG. 4 that rather than using an SDRAM or DRAM memory block close to CPU 150, a block of magnetoresistive memory is used. Specifically, MROM 166*a* and MRAM1 166*b* are in communication with CPU 150 indirectly via a first or primary memory hub MH1 160. Such a memory hub can be similar to the north bridge 60 of gaming machine 10, or can be any other suitable device adapted to facilitate communications to the CPU 150. For example, primary memory hub 160 can be an ASIC adapted to facilitate and control communications between CPU 150 and both MROM 166*a* and MRAM1 166*b*. In some situations, such an ASIC can be configured to control or prevent writing to MROM 166*a*, as set forth in detail below. Such an ASIC can be, for example, the M1651 Northbridge product made by ALi Corporation of Taipei, Taiwan. In some embodiments, MROM 166*a* and MRAM1 166*b* can be combined physically as one large memory unit or bank of memory units, with the primary distinction between them being that the units or portions thereof that make up the MROM cannot be written to.

Of the various standard gaming machine components that are not included in specialized gaming machine 100, the CD-ROM, read only hard drive portions and EPROMs for storing the boot code have all been replaced by MROM 166*a*, while the read-write hard drive portions and battery backed safe storage NVRAM2 have been replaced by MRAM1 166*b*. Hence, at least a portion of MROM 166*a* can be designated as a "BOOT" portion, while at least a portion of MRAM1 166*b* can be designated as a safe storage "NVRAM" portion. In fact, it is preferable that all of MRAM1 be non-volatile random access memory. The actual devices that make up this MROM 166*a* and MRAM1 166*b* can be, for example, a bank or array of the MR2A16A model 4 Mb MRAM units made by Freescale Semiconductor and/or the 16 Mb MRAM units that were recently demonstrated by Infineon Technologies AG, although any other suitable MRAM or MROM units may be used as well. In fact, any and all MROM and MRAM components found in both gaming machine 100 of FIG. 4 and gaming machine 200 of FIG. 5 can similarly be made up of one or more of the Freescale, Infineon, or other suitable MRAM devices. It is also worth noting that the internal CPU caches 151, 251 of these gaming machines may also comprise some form of MRAM and/or MROM, as future technologies render such options available, and it is specifically contemplated that such additional embodiments be usable within the contexts of the present invention.

Continuing further, it can be seen that a secondary memory hub MH2 180 has essentially replaced the FPGA 80 of gaming machine 10. Although various items may still branch off from this secondary memory hub 180, the elements contained within safe storage NVRAM2 81 and boot EPROM2 82 of gaming machine 10 have preferably been relocated to MRAM1 166*b* and MROM 166*a* respectively. One item that can remain as branching off of secondary memory hub MH2 180 is a "black box" storage device for storing data specific to the exterior cabinet or physical terminal of a gaming machine or system, similar to the function performed by EEPROM 83 of gaming machine 10 discussed above. Rather than use a slow EEPROM for such a function though, such a black box storage device can be a superior MRAM device, such as the MRAM2 183 illustrated in FIG. 4, for example. As noted in the above example, the secondary or auxiliary data or computer code to be stored at a "black box" storage device such as MRAM2 183 can include a variety of items, such as overall cabinet or terminal based meter data, backup data or code for other gaming machine or system components, and/or other gaming machine or terminal specific information, such as country designations, accounting denominations, machine yield data, progressive jackpot data, volume settings and overall gaming machine configuration data, among others.

As is also noted in the foregoing example, a "black box" storage device such as MRAM2 183 is also preferably associated with a back plane board of the gaming machine, such that it typically remains with the gaming machine cabinet. It is also worth noting again that, similar to gaming machine 10, various components of gaming machine 100 can be associated with this back plane board or the gaming machine cabinet in general, with such components generally including those within back plane board region 141. Also similar to the above example, those components that are typically associated with the main processor board are generally included within brain box region 140 of gaming machine 100. As shown, such designations would include MROM 166*a* and MRAM1 166*b* as generally being within brain box region 140 and thus associated with the brain box or main processor board, while MRAM2 183, logging device 163 and MRAM3 167 associated with this logging device are generally within back plane board region 141 and thus are associated with the exterior housing or physical terminal of the gaming machine or system.

Logging device 163 can be substantially similar to the tell-tale board 63 of gaming machine 10, although it is specifically intended that logging device 163 can be a tell-tale board or any other device adapted to log or record information related to powered down or offline activities at the gaming machine. Unlike gaming machine 10 above, gaming machine 100 provides a superior storage device associated with its tell-tale board or other suitable logging device 163. Such a storage device for offline activity data recording can also be an MRAM, such as the MRAM3 167 illustrated. As shown for gaming machine 100, the logging storage component MRAM3 167 is a dedicated device, such that the logging device 163 is the gaming machine component that must both write to and read from this storage component. Other arrangements are also possible, as noted in greater detail below.

Figure 5:
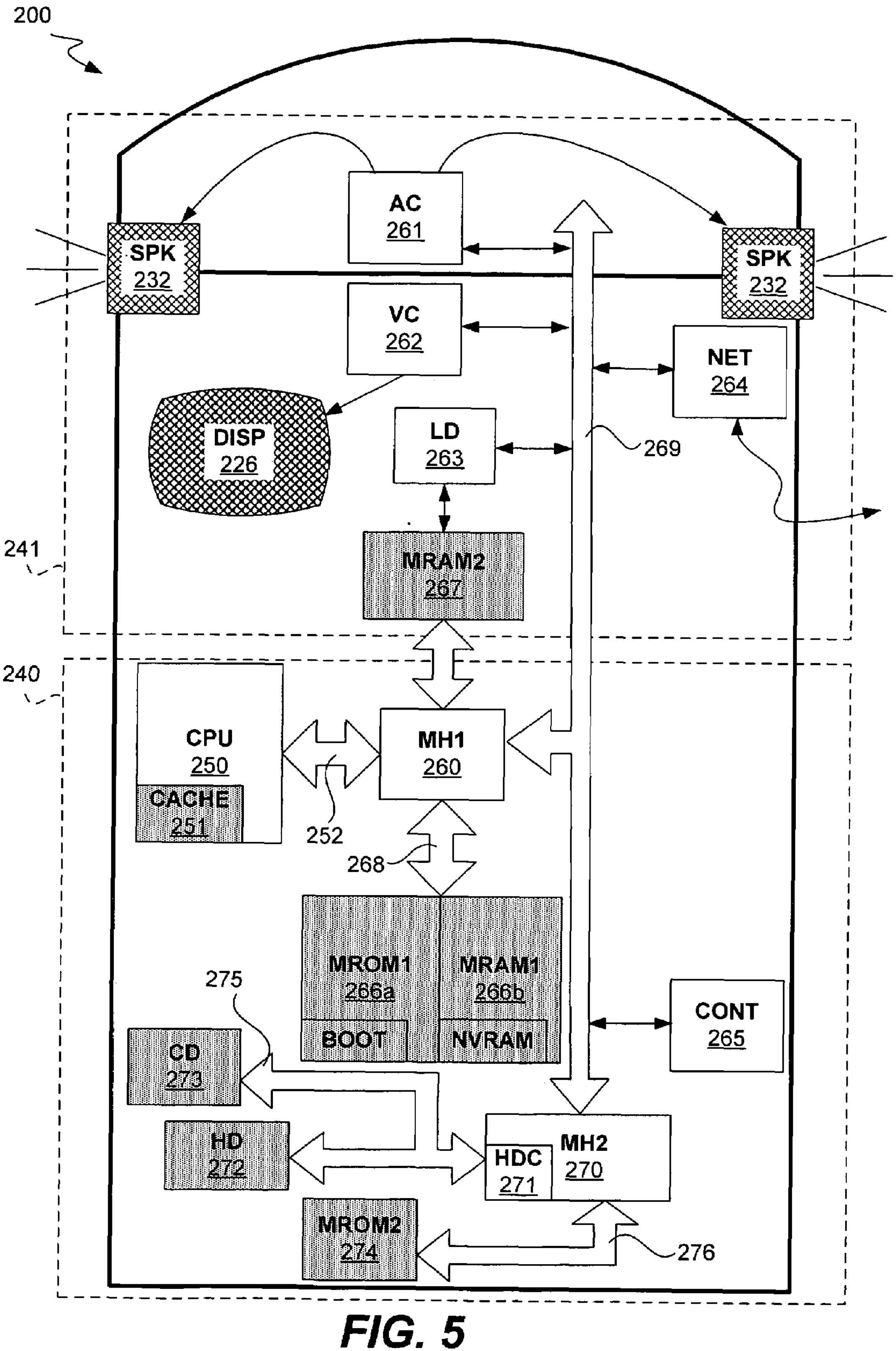
FIG. 5 illustrates in block diagram format an alternative exemplary partial hardware architecture for a specialized gaming machine having magnetoresistive storage devices according to another embodiment of the present invention.

Moving next to FIG. 5, a block diagram of an alternative exemplary partial hardware architecture for a specialized gaming machine having magnetoresistive storage devices according to another embodiment of the present invention is shown. Gaming machine 200 is similar to gaming machines 10 and 100 in outward appearance, having a top box, main cabinet, primary display 226, speakers 232 and various other components that can be identical or similar to those found in or on gaming machines 10 or 100. Other components can also be identical or similar to those from gaming machine 10 or 100, including the audio controller 261, video controller 262, network controller 264, generic controller 265, CPU 250 and its incorporated cache 251, CPU bus 252, memory bus 268 and PCI bus 269, among others. In addition, several components can be identical or similar to those from specialized gaming machine 100, such as a first or primary memory hub MH1 260, a primary MROM1 266*a*, a primary MRAM1 266*b*, a logging device 263 and a secondary MRAM2 267, among others.

Unlike gaming machine 100, however, specialized gaming machine 200 can include a hard drive 272, CD-ROM 273 and secondary MROM2 274, as well as a secondary memory hub MH2 270 adapted to link each of these devices to PCI bus 269 in a manner similar that that which was done by south bridge 70 of gaming machine 10. A hard drive controller 271 and/or other similar items may reside on the secondary memory hub 270 for such purposes. Of course, an IDE bus 275 or other similar bus can be used to connect the hard drive 272 and CD-ROM 273. While bus 276 to MROM2 274 can be an ISA bus, as in gaming machine 10, a faster bus may be preferred due to the increased access speed of an MROM. It may even be desirable to locate such a secondary MROM at a more accessible location, such as directly off of the primary memory hub MH1 260 or off of CPU 252, for example, in order to take advantage of the increased access speed of the MROM. The arrangement provided in FIG. 5 may be desirable where CD-ROM and/or traditional hard drive capabilities are preferred within a gaming machine, in addition to one or more MROM devices.

Another notable difference in the architecture of gaming machine 200 is the ability of the logging device storage unit MRAM2 267 to be accessed by other components, such as through a separate connection or memory bus to the primary memory hub MH1 260. Accordingly, this logging device MRAM2 267 can be a dual or multi ported memory arrangement, with one port being accessible to the logging device 263, at least for writing access purposes, and another port being accessible to the CPU 250 (i.e., MGC) or other security type device, at least for reading access purposes. Under such an arrangement, the CPU could be adapted to read data from the logging device memory unit MRAM2 267 immediately after power is restored to the gaming machine, without having to inquire to the logging device 263 for such data. Yet another notable difference is the elimination of a separate "black box" exterior housing based storage device. Instead, the storage that would ordinarily be associated with such an item can be made to a designated portion of MRAM2 267. That is, one portion of MRAM2 267 could be used for recording details of powered down activities, as is done on a tell-tale board, while another portion of MRAM2 267 could be used for recording exterior housing based data or code, such as absolute meter data and other items, as detailed above.

Although specific, exemplary, specialized gaming machine architectures have been provided for purposes of illustration in FIGS. 4 and 5, it will be readily appreciated that many other arrangements and embodiments utilizing MROM and/or MRAM as gaming machine storage devices can be used. The present invention specifically contemplates any and all other such arrangements and embodiments involving MROM and/or MRAM as storage devices at a gaming machine. Also, although gaming machines 100 and 200 of FIGS. 4 and 5 are both specialized gaming machines in the sense that they include MROM and/or MRAM storage devices, it will be readily appreciated that a wide variety of devices can be used in conjunction with the inventive apparatuses, systems and methods disclosed herein. Such other devices can be specialized gaming devices with displays, as well as any other device that can be implemented with an MROM or MRAM device, as disclosed and detailed herein. Although it will be understood that such other applications can be used with the inventive systems and methods disclosed herein, the focus here shall remain on examples involving actual gaming machines for purposes of this discussion.

Referring again to FIGS. 4 and 5, it can be seen that the gaming machines 100, 200 of both figures contain primary high speed code and data storage for regular use by the CPUs 150, 250 in the form of a primary MROM (166*a* or 266*a*) and a primary (MRAM 166*b* or 266*b*). As noted above, various boot programs and code are usually stored in some form of ROM, such as the EPROMs of gaming machine 10. One example of such code would be authentication code, although it will be readily appreciated that there can be many other types of boot code and programs. Under such an arrangement, the boot programs and code stored on the EPROMs is loaded into a much faster DRAM, SDRAM or similar storage device for practical reasons in order to conduct further gaming machine operations with the code. Such traditional boot procedures from EPROMs can be particularly slow, even causing a bottleneck in the start up process, where significantly sized images and/or other large files are included as part of the transfer process during start up.

In the specialized gaming machines 100, 200, however, such boot programs and code can all be stored at the high speed and readily available MROMs 166*a*, 266*a*, such that there is no need to copy these programs and code to another memory location or storage device. Upon a boot or other initiation procedure, the gaming machine can simply run the programs and code from their original storage locations on the MROM without making copies of the programs or code. In addition, both the basic BIOS and extended BIOS can be stored on the MROM, either in two locations are altogether, thus eliminating any need for a basic BIOS to authenticate an extended BIOS. In this manner, various CRCs, checksums, authentications and other traditionally non-trivial legacy boot procedures can be rendered unnecessary through the use of MROMs. Such arrangements are thus much more efficient in that they save substantial amounts of time and process steps for boot processes, as well as reducing the number of devices that are needed.

MRAM and/or MROM, as noted above, can also be used for a number of other gaming machine functions, such as to store gaming machine configuration data, history recall, graphics and display data, downloadable games and a myriad of other RAM uses and functions. MRAM and/or MROM can be used to update a gaming machine and/or its peripherals quickly, and as such can be included separately with one or more peripherals or other external devices, as desired. Peripherals and other devices that might have one or more separate dedicated or localized MRAM or MROM units can include, for example, a bill acceptor, spectrum controller, touch screen controller, light bezel, ticket printer, bonusing top box, card reader, candle, coin acceptor, smart hopper, player tracking device, video card, sound card, PC style BIOS or extended BIOS, FPGA, solid state mass storage, and any remaining EEPROMs, among others. By replacing some or all of the various RAM, battery backed RAM, EPROMs, EEPROMs and/or other memory or storage devices in a gaming machine and its assorted peripherals with MRAM, gaming machines can be made more reliable and also easier to develop. As referenced above, one feature that may be possible through the extensive use of MRAM is an "Instant On" ability of the gaming machine, where there remains little need to load and reload programs or code to faster storage devices for regular gaming machine operations.

In embodiments where massive amounts of MRAM are used to store entire operating systems, game applications and/or configuration data for some or all peripherals, a gaming machine can be up and running in a matter of seconds, or even less, after power is first applied. Of course, it may still be desirable to retain some transactional style programming within an MRAM heavy gaming machine simply for security purposes, such as where a flag can be used to indicate that a transaction has been processed, in the event that a safe storage recovery might be rendered necessary. Other uses for MROM and MRAM within a gaming machine or system may become readily apparent from the many descriptions and examples provided herein, and it is specifically contemplated that such other readily apparent uses be included within the present invention. For example, the extensive use of MROM and MRAM devices to replace many or all traditional storage devices in a gaming machine and its peripheral devices may result in the possibility of implementing an improved and more unified bus structure. While other slower buses, such as a PCI bus, for example, may be retained to accommodate those peripherals that dictate such buses, if necessary, many other buses can be replaced with and/or combined to result in fewer high speed memory buses, as will be readily appreciated. Variations of possible arrangements can be seen to some extent in the exemplary specialized gaming machines illustrated herein, such as the reduction of buses in gaming machine 100 and the provision of at least one extra improved memory bus in gaming machine 200, for example.

In the case of MROMs, a particular concern may arise over the potential to write to or overwrite within such a device, since MRAMs are currently typically random access storage devices by nature. In order to use a MRAM device in place of a ROM device then, special consideration should be given to the write ability of MRAM. An existing MRAM can have at least a portion thereof, or alternatively the entire device, rendered as unwritable and unalterable through any of a number of techniques, thereby rendering the MRAM as a read-only or "MROM" device. Some techniques could involve a physical termination of or to a write connection of the MRAM, preferably while gaming machine operational computer code is stored at the MRAM. In one embodiment, a physical hardware jumper or key can be used to allow an installed MRAM device to be written to. Without such a jumper or key, any write operation to the MRAM device could not be performed. In another embodiment, a special write protection circuit within the gaming machine or system could detect an attempted write operation and then initiate a reset or "tilt" in the gaming machine or system as needed. In yet another embodiment, the write pin or pins on the MRAM could be physically cut, or would otherwise not be wired into the gaming machine or peripheral circuitry, thus necessitating the removal of the MRAM device for any needed reprogramming. Such an embodiment could involve, for example, an MRAM that is removably plugged into a PCB socket within the gaming machine such that its write pin does not make an appropriate connection to any write device via the socket. In still another embodiments, an internal fuse on an MRAM can be blown such that the device would no longer be writable or alterable.

Under other possible techniques, a memory hub or other control device can be arranged such that any possible writing to or altering of an MRAM would be controlled and/or prohibited by the monitoring or control device. Such a device could be, for example, an ASIC, FPGA or other similar device that could be programmed to hold the write line to the MRAM or any desired unwritable portion thereof in a high state or other "off" position at all times. In one embodiment, an encryption layer can be present within the controlling ASIC, FPGA or other memory hub device, such that tampering with the control device might be prevented or inhibited. It will be readily appreciated that the forgoing physical alteration and other techniques can be used to render an MRAM device as an MROM in a physical sense, while any write control techniques can be used to effectively render an MRAM device as an MROM device in a practical sense, and that any such technique might be used to result in an MROM device for a gaming machine, such as MROMs 166*a* and 266*a* in the examples above.

In some embodiments, MROMs and/or MRAMs can be implemented onto removable and interchangeable memory cards or blades, with various slots or ports for such cards or blades being implemented within the gaming machine or system as necessary. In such cases, it might be preferable to burn entire game applications onto an MRAM or MROM memory card or blade, and then swap these cards or blades in and out of various gaming machines as desired. In this sense, the various game application cards or blades can be used like "cartridges," such as those used for some video game systems, for example. Such an application of MROM and/or MRAM would provide added flexibility for some gaming operators in the form of gaming machines that could have their games readily changed as conditions change.

Turning next to the logging devices 163, 263 and their associated MRAM storage devices 167, 267 of FIGS. 4 and 5, it is again noted that MRAM is a superior form of memory storage for logging details of powered down or off activities at a gaming machine, at least due to the ability of MRAM to be written to at low power levels and to retain its memory without requiring any power to do so. Accordingly, the life of any secondary power supply to the logging devices, such as a battery or a network cable, for example, can be extended significantly. It is again noted that due to such conservation of power in the use of MRAM devices, that more than the typical one or two details regarding offline activities can be recorded. For example, the battery backed logging device 63 of gaming machine 10 might ordinarily only be able to record whether a main door ever opened and/or whether a brain box door ever opened while power was down, but no other details, since the NVRAM1 67 of gaming machine 10 ordinarily requires too much power to write to and/or to retain its data. Conversely, a battery backed logging device 163 of gaming machine 100 can write data at low voltages regarding numerous details of such events to MRAM3 167, which requires no power to retain such data written to it.

As shown in FIG. 4, logging device 163 of gaming machine 100 has its own dedicated MRAM unit MRAM3 167. In such a particular embodiment, the logging device 163, upon detecting that main power to the gaming machine has been lost or reduced significantly, can begin monitoring for various offline activities at a plurality of gaming machine components. Activities that can be monitored for, and details for which can subsequently recorded, might include those that take place at, for example, a main door, a brain box door, a bill drop door, a bill validator, a bill dispenser, a coin hopper, a coin acceptor, a ticket printer, a touch screen, a bezel, a spectrum controller, a player tracking device and a game reel, among others. When activity is detected at one or more of these components, details of the activity can be recorded to the dedicated offline logging memory unit MRAM3 167. Such details can include not only that a door was opened, an area accessed, or the like, but also the date, time, duration, manner and other pertinent details, as appropriate. In any event, it is preferable that the number of details that are recorded for such offline activities exceed the limited two or three detail capacity of a typical traditional logging device.

When power is later restored to the gaming machine, a query can be made of the logging device to provide any stored data regarding offline activity details. Such a query can be made from the MGC, such as CPU 150, or any other security device tasked with offline activity concerns, such as a network or system processor or monitoring component, for example. Such queries can be made, and data forwarded, along any appropriate bus or communication device, and in any appropriate format, such as CAN, USB, Netplex, and the like. Appropriate action can then be taken if it is determined that undesirable offline activity has occurred, such as the opening of a main door or brain box door. Such action can involve a notification to the casino operator, security personnel, and/or law enforcement authorities, as appropriate.

Alternatively, as shown in FIG. 5, the logging device 263 might connect to a storage device MRAM2 267 that is a multi-port device, such that other devices beyond the logging device can access the MRAM for its data. In addition, as noted above, such a storage device could possibly be used for other purposes beyond the storage of data regarding offline gaming machine activities or events, such as for cabinet or exterior housing based meters or data. As shown in FIG. 5, the exemplary storage device MRAM2 267 is a dual port device, with one port connected to the logging device 263 and the other to the primary memory hub MH1 260 via a memory bus or other suitable connection. Preferably, the logging device 263 is adapted to access MRAM2 267 at least to write to it while the main power to the gaming machine from a primary power source is down, while the memory hub MH1 260 is adapted to access MRAM2 267 at least to read from it to forward data to CPU 250 when the main gaming machine power is restored.

In either of the foregoing embodiments, the logging device (163 or 263) could be configured as an "Instant On" device, whereby low or no levels of power are provided to the logging device from its secondary power source (e.g. battery) when no offline activities are taking place, but where power to the device is ramped up when such an activity or event is detected. In such embodiments, one or more monitoring circuits can be implemented within the gaming machine, with small amounts of power being used to loop within the circuit and thereby detect for any circuit break (i.e., activity), such as where a door is opened. Such monitoring circuits can be made to monitor for various activities and events of concern while the main power to the gaming machine is down as well as during normal full power periods. For instance, it may be desirable to monitor for any opening of the main door of the gaming machine, regardless of whether main power is present or not. Monitoring circuits could then be designed to detect for such occurrences at any time. Further, details regarding any such activities could be recorded whether main power is down or not, as will be readily appreciated. Again, a primary advantage of the presently provided system is that more details of various offline or powered down activities and events can be recorded due to the lowered power demands of MRAM devices.

In an alternative embodiment not shown, a plurality of gaming machine peripherals or devices can each possess separate dedicated logging and storage devices adapted to perform logging of powered down or offline activities at the respective devices. Such "smart" peripherals or devices are thereby adapted to log their own activities to their own storage devices during periods of low or no power to the gaming machine. The storage device at each such "smart" peripheral is preferably an MRAM device similar to those shown above, since again such devices can be reliably adapted to store more data for lower levels of power consumption. In such embodiments where a plurality of smart devices or peripherals each have their own separate storage for offline events, it is preferable that each separate logging device be adapted to forward any pertinent data regarding offline activity details to the appropriate CPU or other security device once main gaming machine power through its primary power source is restored. In other alternative embodiments, it may even be desirable for such information to be forwarded to such other security device or element, such as a network processor that is still powered, while the main power to the affected gaming machine remains down. Such an alternative of reporting to an outside source even while power remains down could apply to any logging device embodiment, including those shown in FIGS. 4 and 5 as well.

Returning the focus now to the primary MRAM1 devices 166*b*, 266*b* of FIGS. 4 and 5, it is noted the entire traditional safe storage process for a gaming machine or system can be eliminated or at least greatly simplified through the use of such MRAM devices. A primary reason for this is that these MRAM devices are both fast and non-volatile, such that they are able serve the dual purposes of both regular gaming machine operational use by the gaming machine MGC or CPU, and as safe storage to facilitate a gaming machine state recovery in the event of a substantial interruption to the gaming machine. In this regard, at least a portion of such a newly implemented MRAM can be used as a singular replacement for both DRAM and NVRAM in a regular gaming machine architecture, such as that shown in FIG. 2 for gaming machine 10. As previously noted, some of the many resulting efficiencies of such an embodiment include a reduction in the numbers and types of components used, faster overall processes, and the reduction or elimination of copying programs or portions of code to alternative locations for faster use during normal operations.

Another significant efficiency that can be realized under the provided devices and systems is that it may become unnecessary to prioritize what and how items are recorded to safe storage. Under traditional safe storage processes, there is usually concern over battery life with respect to what is recorded on any battery backed RAM or other nonvolatile storage device adapted to retain data in the case of a power hit or other substantial interruption to the gaming machine. Accordingly, the amount of data that can be stored to such a battery backed RAM for potentially long periods of time is limited, thus typically resulting in the need to prioritize what data is stored to the limited battery backed RAM at any given time. Through the use of MRAM, however, such concerns are obviated, as MRAM is able to store any amount of data indefinitely without the use of any battery or other secondary power source. Thus, the safe storage for a given gaming machine can be increased to levels much larger than the typical 4 Megabytes or so that are now used. Such increased safe storage memories can be increased in size to, for example, 512 Megabytes or more, as desired. In some instances, the entire MRAM1 166*b*, 266*b* can be considered as safe storage, since none of the data contained therein should be lost during a power loss or outage for an indefinite period of time.

It is also noteworthy that many devices that are external or peripheral to the core of the gaming machine might also benefit from significant uses of MRAM and MROM in the gaming machine, as described above. Where such peripherals or other devices are adapted to include their own separate MRAM as dedicated and/or localized storage units, such peripherals or other devices would likely no longer need to be configured each time that the gaming machine is powered up or otherwise rebooted. Examples of peripherals and devices that would likely benefit in such a manner can include bill validators, coin acceptors, video cards, CVTs, eKeys, various USB peripherals, dongles, host systems, and many others, as will be readily appreciated. In addition, it may be desirable in some cases still to provide backup for various MRAM storage devices, particularly where there may be concerns over possible corruption or physical damage issues, in which case a secondary backup might be handy. For such concerns, it would be preferable that such a backup device be placed in a different location within the gaming machine, such that if a projectile, fire or other physically damaging item were to somehow damage a primary MRAM component, such as MRAM1 166*b* or 266*b*, then the back up MRAM at an alternate location might be accessed. Such a back up MRAM could include a portion of the cabinet or exterior housing based MRAM2 267 of gaming machine 200, for example.

Given that "Instant On" capabilities for the gaming machine can be made possible through MRAM, as noted above, it may also be desirable to back up the memory image of any newly loaded game application by storing it separately at a secondary back up MRAM. By copying a memory image into the primary MRAM, if such an occasion is needed, the game could then be restored or loaded very quickly. A memory image of each game could also be stored to the secondary back up MRAM as part of installation package, if desired. All games that are enabled by the operator and selectable by the player could then have their memory images loaded into this secondary MRAM, which could then be quickly accessed and copied into primary MRAM where a game change is desired. One particularly advantageous embodiment of such an arrangement could involve a library of dozens or hundreds of game applications that are stored on a large bank of secondary MRAM devices within a given gaming machine. Such a large library of games could then be made available to players on demand, and an appropriate arrangement within the given gaming machine could facilitate very fast accesses of these many different games to be loaded to the primary MRAM for continued access during future game play.

As another consideration, it may become necessary to implement a "file system" or specialized RAM Drive to determine the locations of specific chunks of data stored in MRAM memory, such as after recovering from a power failure. While such a file system is typically not necessary or used within a traditional electronic gaming machine, the implementation of massive amounts of MRAM to replace many traditional memory components might result in a need for such a file system. This file system might be implemented on the MRAM itself, or could alternatively be implemented on one or more other types of storage devices, such as an EEPROM, as various situations warrant.

In addition, as noted previously, MRAM can also be used in place of a "black box" EEPROM that traditionally functions as an ultimate back up memory and stays with cabinet or exterior housing of the gaming machine when other components get replaced. Such a secondary or auxiliary MRAM could be, for example, the MRAM2 183 of gaming machine 100 or the MRAM2 267 of gaming machine 200, although other arrangements are certainly possible. Among other features, this secondary cabinet based MRAM can function as an NVRAM backup (i.e., a backup for MRAM1 166*b* or MRAM1 266*b*), and can be adapted to record a "snapshot" of all gaming machine meters on a cyclical basis, such as for every 10, 100 or 1000 game plays, for example. Of course, other cycle intervals could be set, and it may even be desirable for the secondary MRAM to record a back up "snapshot" of all meters or other gaming machine data after every game play, in some cases.

Methods Of Operation

In general, the foregoing components and architectures can be utilized to create specialized gaming machines and systems that are adapted to function at higher capacities, at greater speeds, and with improved functionalities. As detailed above, this can be accomplished by implementing one or more MRAM or MROM storage devices in a gaming machine or system, with such devices possibly replacing one or more existing storage devices of inferior attributes. In addition, various other gaming machine architectural components can be restructured or eliminated altogether, such as in the case of EEPROMs, EPROMs, DRAMs, SDRAMs, battery backed RAMs, hard drives, CD-ROMs, south bridges, FPGAs, and/or other types of storage devices and architectural components, as desired in various particular instances. Several methods of operation or use for gaming machines or systems having MRAM will now be provided. While the provided flowcharts and accompanying discussion may be comprehensive in some respects, it will be readily understood that not every step provided is necessary, that other steps can be included, and that the order of steps might be rearranged as desired for a given application.

Figure 6:
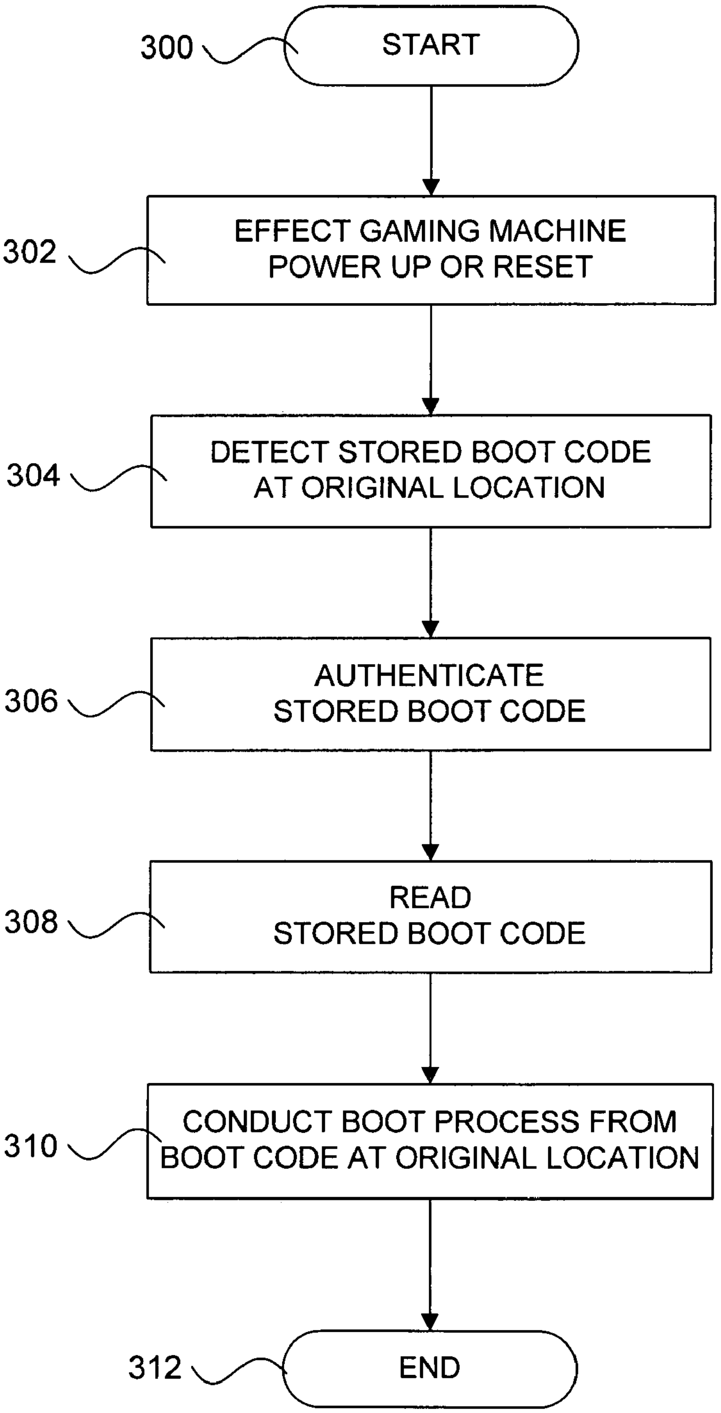
FIG. 6 provides a flowchart of one exemplary method of booting up a specialized gaming machine without copying significant portions of code to a faster memory location according to one embodiment of the present invention.

Turning first to FIG. 6, a flowchart of one exemplary method of operating a specialized gaming machine according to one embodiment of the present invention is illustrated. In particular, this method of operation involves booting up the gaming machine or system software without copying significant portions of boot code to a faster memory location. In other words, the original Read Only location where the gaming machine or system boot code is stored is the location that is used repeatedly when access to that code is needed for later boot processes or regular gaming machine operations. This can be made possible through use of a superior Read Only storage device, such as an MROM as described above, since an MROM can retain its storage, cannot be overwritten, and is fast enough to use repeatedly in regular gaming machine operations (i.e., as if it were DRAM).

After a start step 300, a power up or reset is effected at the gaming machine at process step 302, thus initiating the boot or reboot process. Besides a general power up, such a reset condition can also include, for example, those that arise due to a power outage, a substantial electrostatic discharge, a critical hardware malfunction, a critical software malfunction, a gaming machine tilt and physical damage to a critical gaming machine component, among others. At a following process step 304, stored boot code is detected at an original stored location. This can be, for example, the MROM 166*a* of gaming machine 100 in FIG. 4 or the MROM1 266*a* of gaming machine 200 in FIG. 5, among other possibilities. The stored boot code can then be authenticated and read at subsequent process steps 306 and 308. Of course, the order of these steps can be reversed in some cases, if desired. In addition, a copy of the stored boot code might be made for purposes of authentication, in which case the authentication involving such a copy can occur elsewhere at the gaming machine or system. This might facilitate parallel processing with the boot code, at least with respect to an authentication being performed while other boot processes are being run from the original stored location, as will be readily appreciated. Regarding process step 308, the stored boot code is preferably read at a rate faster than 8 MHz, which is the typical rate at which boot code is read from an EPROM. Of course, speeds above 33, 66 or 133 MHz are also possible where the storage device is an MROM or other similarly fast device, and the bus used does not limit the rate of data transfer. In ideal situations, speeds of 800 MHz or greater should be attainable where MROM and a fast memory bus are used.

One or more boot processes are then conducted based only upon the reading of the stored boot code at its original location at following process step 310, after which the method ends at end step 312. Such boot processes are preferably conducted without creating a copy of the stored code to any other storage device for purposes of conducting the boot processes, although it might be desirable to make a copy for authentication purposes, as noted above. In some embodiments, the stored code can be boot code and/or code for other gaming machine programs or processes, such as code for a boot loader, a boot up process, an initialization process, an authentication process, a configuration process, a diagnostics process, an operating system, and a specific game application, among others. In cases where stored code might be other than boot code, then process step 310 could simply involve conducting one or more regular gaming machine operations based on reading the stored code from its original location. Such regular gaming machine operations could include, for example, making a meter change, providing a meter display, processing a game selection, processing a game play, determining a partial game outcome, determining a complete game outcome, providing a game display, providing a coin out, providing a cashless instrument out, making a machine yield calculation, providing an informational display and making a data communication, among others.

Figure 7:
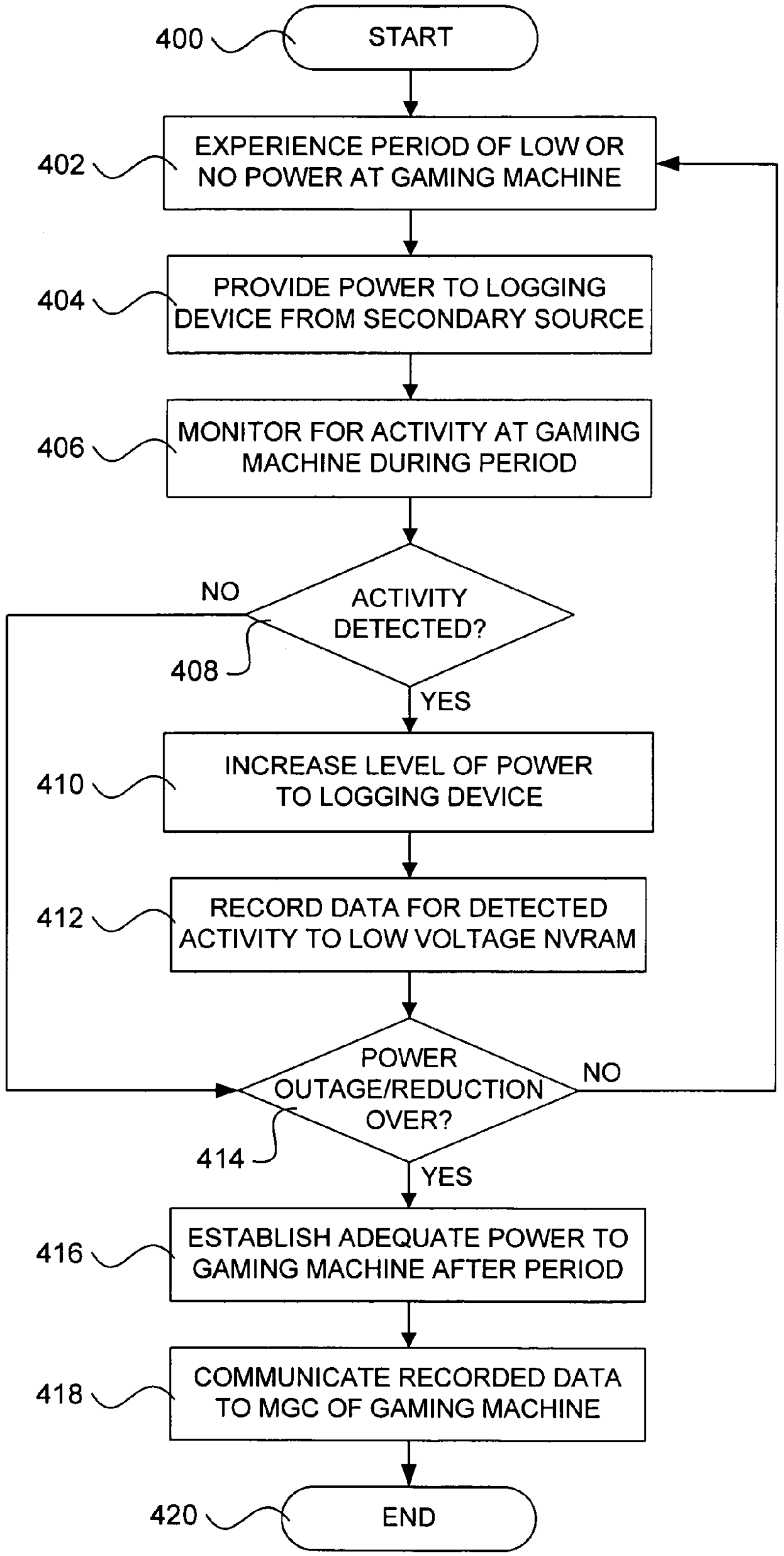
FIG. 7 provides a flowchart of one exemplary method of logging various significant details regarding activities at the gaming machine while the primary power source to the gaming machine is down or off according to one embodiment of the present invention.

Moving next to FIG. 7, a flowchart of another exemplary method of operating a specialized gaming machine according to another embodiment of the present invention is illustrated. In particular, this method of operation involves logging various significant details regarding activities at the gaming machine while the primary power source to the gaming machine is down or off. As noted above, this can be done by using a tell-tale board or other similar device, such as, for example, the logging device 163 of gaming machine 100 or the logging device 263 of gaming machine 200. Of course, it is preferable that superior memory devices be used in conjunction with such logging devices, such as one or more MRAM devices, as noted above for use with logging devices 163, 263. In this manner, storage for recording details of powered down activities would then take less power to write to, would not require power to retain its memory, and would be of greater capacity than the storage of tell-tale board 63 of gaming machine 10.

After a start step 400, a period of low or no power (i.e., powered down period) is experienced from the primary power source to the gaming machine at a process step 402. Such an inadequate level of power can be a result of a power outage or reduction, a gaming machine tilt or malfunction, or simply turning off the gaming machine for whatever reason. At process step 404, power is provided to a logging device from a secondary source, which can be a battery, a network cable, or some other alternative power source. Again, this secondary source power is provided so that the logging device can perform various activities offline while the main power source is down. At subsequent process step 406, the logging device or some other monitoring component monitors for activity at the gaming machine while the main power is down or off. Such monitoring can be undertaken at low power levels, such as by sending small electrical currents through various monitoring circuits, as noted previously. Activities that can be monitored for (and details for which subsequently recorded) can include those that take place at, for example, a main door, a brain box door, a bill drop door, a bill validator, a bill dispenser, a coin hopper, a coin acceptor, a ticket printer, a touch screen, a bezel, a spectrum controller, a player tracking device and a game reel, among others.

An inquiry is then made at decision step 408 as to whether activity has been detected at one of the components for which activity should be recorded. If not, then the process jumps to inquiry step 414. If activity has been detected, however, then the level of power to the logging device can be increased, if necessary, at the next process step 410. Such a power increase might be necessary where the logging device is an "instant-on" device that is kept in a low power "sleep" mode while the gaming machine or system is monitored for pertinent activity, in order to conserve power when no activity occurs. Data can then be recorded for various details relating to the detected activity at process step 412, with such data preferably being recorded at a low voltage, such as about 4 volts or lower, in order to conserve power. This would be possible where data is stored to a low voltage non-volatile RAM, such as an MRAM, which can typically be written to at voltages of lower than 4 volts, such as, for example, about 2.7 to 3.6 volts. In some embodiments, the data can be recorded to a specific multi-port storage device, such as the MRAM2 267 of gaming machine 200 above, whereby the device can be accessed by both the logging device and the MGC or other security component.

In the event that an activity may be detected for an extended time period, an "instant-on" logging device, if used, may be designed to revert back to sleep mode where no new details have been noted for a certain period of time. For example, where it is detected that a main door has been opened, an instant-on logging device can be powered up to record the date and time of the occurrence, as well as additional other sensed activities for a set time period (e.g., one hour) after the door was opened, such as a manual repositioning of a game reel or an attempted entry to a coin hopper or other machine component. If the main door remains open, but no additional activity details are sensed for the set time period, then a sleep mode might resume. As noted above, it is preferable that a significant amount of data regarding the details of the activity is recorded, such as at least three details or more.

Once data for the pertinent activity or activities is recorded, an inquiry is then made at decision step 414 as to whether the power outage or reduction from the main power source is over. If not, then the method reverts to process step 402, where steps 404 through 414 are then repeated as before. If the period of power outage or reduction is indeed over, however, then the method continues to process step 416, where an adequate level of power is established to the gaming machine through the primary power source. Preferably, such an adequate level of power through the primary power source would be enough power to accept a wager, play a game, and grant a payout based on the game result. Once main power is in place, the recorded data can then be communicated to the gaming machine MGC or some other security device for an evaluation of offline gaming machine activities, whereupon the method then ends at end step 420. This data is preferably communicated at a speed of 33 MHz or faster, which would be possible where MRAM is used as storage.

Figure 8:
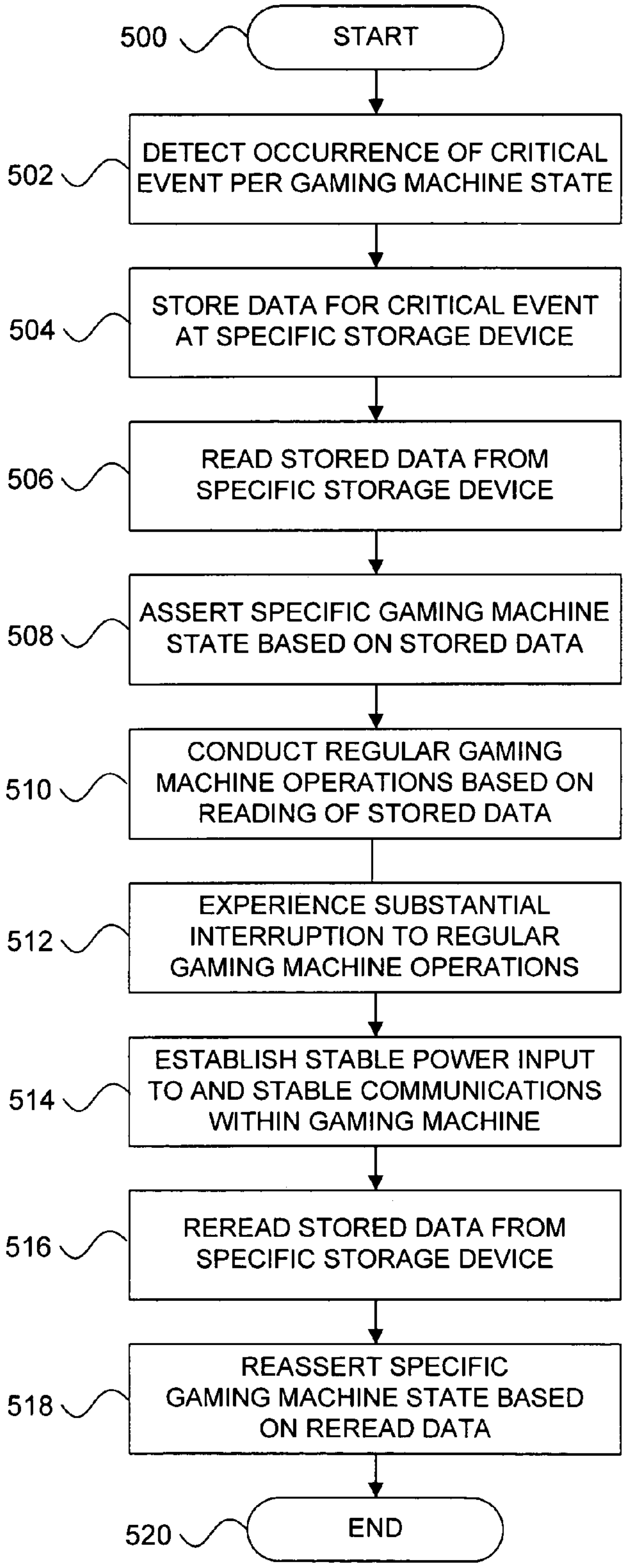
FIG. 8 provides a flowchart of one exemplary method of providing storage for use during regular gaming machine operations and safe storage for recording gaming machine state information at a single storage device or location according to one embodiment of the present invention.

Continuing further to FIG. 8, another flowchart of yet another exemplary method of operating a specialized gaming machine according to another embodiment of the present invention is provided. In particular, this method of operation involves providing storage for use during regular gaming machine operations and safe storage for recording gaming machine state information at a single storage device or location. Since fast access times are typically a primary attribute for storage that is to be used during regular gaming machine operations, and non-volatility is typically a primary attribute for storage that is to be used as safe storage, it is preferable that any storage device to be used for both of these functions be both fast and non-volatile. As noted above, this can be accomplished by using one or more MRAM devices, such as the MRAM1 166*b* of gaming machine 100 or the MRAM1 266*b* of gaming machine 200, either of which can be any form of MRAM device.

After a start step 500, an occurrence of a critical event affecting a state of the gaming machine or system is detected at process step 502. Such a critical event could be, for example, a coin in, a bill in, a cashless instrument in, a meter change, a game selection, a player input, a partial game outcome, a complete game outcome, a coin out, or a cashless instrument out, among others. At process step 504, data for the critical event is stored at a specific storage device, such as one of the MRAM devices noted above. For purposes of illustration in the present discussion, data regarding the critical event affecting gaming machine state is stored within the NVRAM portion of MRAM1 266*b* of gaming machine 200 above. In other words, MRAM1 266*b* is the specific storage device for this example. At a following process step 506, the stored data is then read from the specific storage device. A specific state of the gaming machine is then asserted based on this stored data at process step 508, with such an assertion of the machine state being made on a gaming machine display, or in the form of a payout or printed ticket, for example. Also, it will be readily appreciated that the order of steps 506 and 508 may be reversed in some cases, as desired.

At subsequent process step 510, regular gaming machine operations can preferably be conducted based upon the reading of stored data from the specific storage device, which would be MRAM1 266*b* in this illustrative example. Such regular gaming machine operations can include all or a portion of a wide variety of operational items, such as, for example, a meter change, a meter display, a game selection, a game play, a partial game outcome, a complete game outcome, a game display, a coin out, a cashless instrument out, a machine yield calculation, an informational display and a data communication, among others. It will be readily appreciated that many other events can also be similarly classified as regular gaming machine operations, and that a plurality of the above listed and/or other items can be performed simultaneously at any given time. A substantial interruption to regular gaming machine operations is then experienced at the gaming machine at process step 512, with various examples of such a substantial interruption including a power outage, a substantial electrostatic discharge, a gaming machine reset, a critical hardware malfunction, a critical software malfunction, a gaming machine tilt, and physical damage to a critical gaming machine component, among others.

The method then continues to process step 514, where the substantial interruption is preferably cured by establishing a stable power input to the gaming machine, as well as stable communications within the gaming machine. Such events can occur as part of a boot or reboot process, for example. Alternatively, it may be desirable to conduct this method without performing process step 514, such as where an outside source is adapted to read the state related data from the given safe storage device without powering up or restoring communications within the gaming machine, or where such a restoration is thought to be corrupted or unreliable. An elimination of step 514 might be appropriate, for example, where a manual intervention is needed to retrieve data from the safe storage device, such as where a lost gaming machine state is to be verified in the event of a catastrophic machine failure.

In any event, the method continues to a process step 516, where the stored data is reread from the specific storage device, which again is the MRAM1 266*b* unit for this specific example. It should again be noted that this same MRAM unit is used for the dual functions of storage for regular gaming machine operations and safe storage to record gaming machine state information in the event that a state recovery becomes necessary. After rereading the stored data, at least some portion of the specific state of the gaming machine asserted prior to the substantial interruption is reasserted at process step 518, after which the method ends at end step 520. Such a reassertion can involve, for example, items shown on a gaming machine display, something in the form of a payout or printed ticket, or a representation by the casino, gaming operator or other authority to a player or user through manual intervention.

Network And System Configurations

Figure 9:
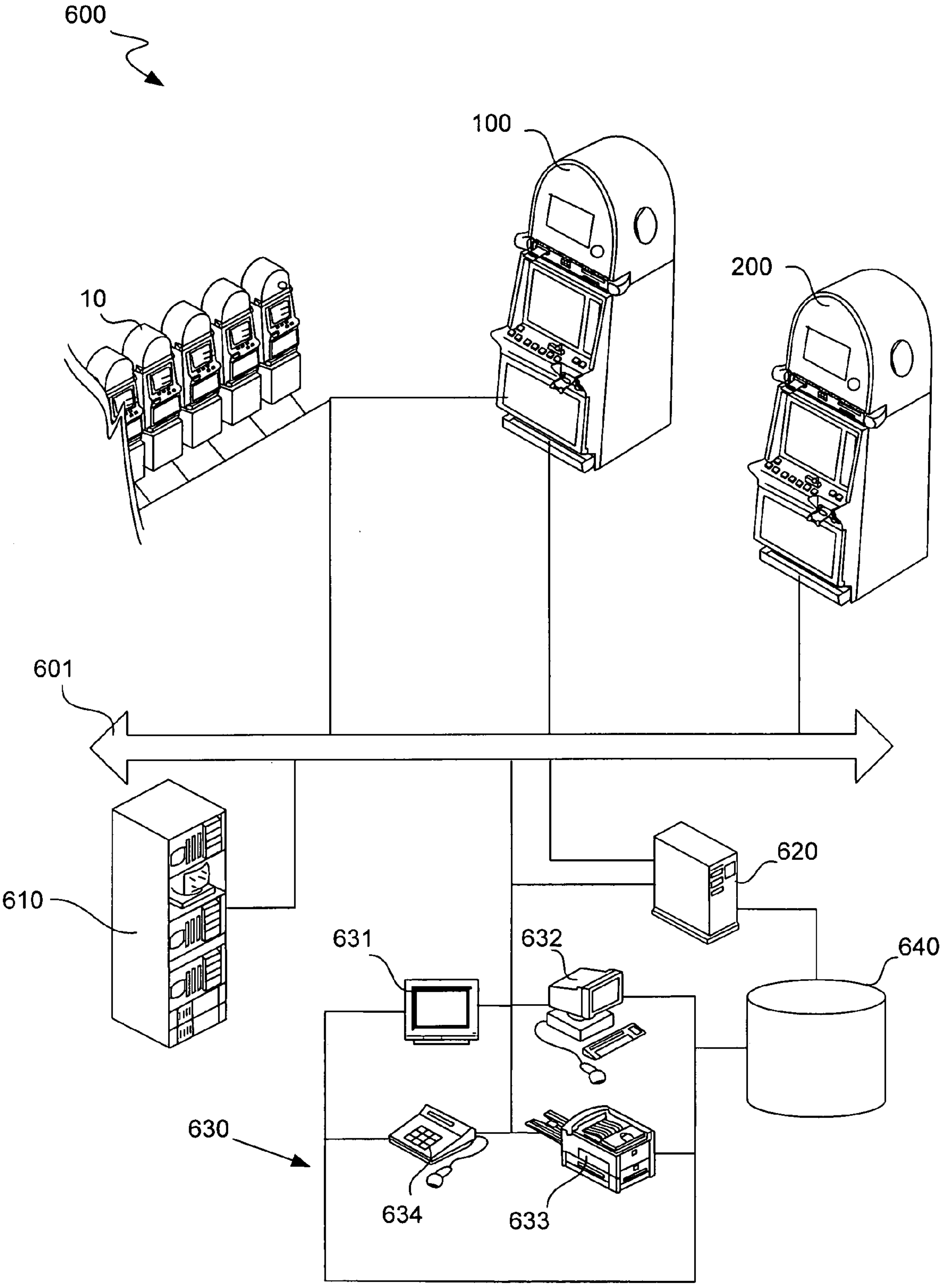
FIG. 9 illustrates a block diagram of an exemplary network infrastructure for providing a gaming system having one or more specialized gaming machines according to one embodiment of the present invention.

Referring lastly to FIG. 9, an exemplary network structure for providing a gaming system having one or more alternative exemplary gaming machines according to one embodiment of the present invention is illustrated in block diagram format. Gaming system 600 comprises one or more specialized gaming machines, various communication items, and a number of host-side components and devices adapted for use within a gaming environment. As shown, one or more specialized gaming machines 100, 200 adapted for use in gaming system 600 can be in a plurality of locations, such as in banks on a casino floor or standing alone at a smaller non-gaming establishment. Of course, other gaming devices such as exemplary gaming machine 10 may also be used in gaming system 400, as well as other similar devices not described in added detail herein.

Common bus 601 can connect one or more gaming machines or devices to a number of networked devices on the gaming system 600, such as, for example, a general-purpose server 610, one or more special-purpose servers 620, a sub-network of peripheral devices 630, and/or a database 640, among other items. Such a general-purpose server 610 may be already present within an establishment for one or more other purposes in lieu of or in addition to monitoring or administering some functionality of one or more specialized gaming machines, such as, for example, providing specific data or downloadable code to such gaming machines. Functions for such a general-purpose server can include general and game specific accounting functions, payroll functions, general Internet and e-mail capabilities, switchboard communications, and reservations and other hotel and restaurant operations, as well as other assorted general establishment record keeping and operations. In some cases, specific gaming related functions such as player tracking, downloadable gaming, remote game administration, visual image, video or other data transmission, or other types of functions may also be associated with or performed by such a general-purpose server. For example, such a server may contain various programs related to player tracking operations, player account administration, remote game play administration, remote game player verification, remote gaming administration, downloadable gaming administration, and/or visual image or video data storage, transfer and distribution, and may also be linked to one or more gaming machines adapted for the transfer of remote funds for game play within an establishment, in some cases forming a network that includes all or substantially all of the specially adapted gaming devices or machines within the establishment. Communications can then be exchanged from each adapted gaming machine to one or more related programs or modules on the general-purpose server.

In one embodiment, gaming system 600 contains one or more special-purpose servers that can be used for various functions relating to the provision of gaming machine administration and operation under the present system. Such special-purpose servers can include, for example, a player verification server, a general game server, a downloadable games server, a specialized accounting server, and/or a visual image or video distribution server, among others. Of course, these functions may all be combined onto a single server, such as specialized server 620. Such additional special-purpose servers are desirable for a variety of reasons, such as, for example, to lessen the burden on an existing general-purpose server or to isolate or wall off some or all gaming machine administration and operations data and functions from the general-purpose server and thereby limit the possible modes of access to such operations and information.

Alternatively, remote gaming system 600 can be isolated from any other network at the establishment, such that a general-purpose server 61 0 is essentially impractical and unnecessary. Under either embodiment of an isolated or shared network, one or more of the special-purpose servers are preferably connected to sub-network 630. Peripheral devices in this sub-network may include, for example, one or more video displays 63 1, one or more user terminals 632, one or more printers 633, and one or more other digital input devices 634, such as a card reader or other security identifier, among others. Similarly, under either embodiment of an isolated or shared network, at least the specialized server 620 or another similar component within a general-purpose server 6 10 also preferably includes a connection to a database or other suitable storage medium 640.

Database 640 is preferably adapted to store many or all files containing pertinent data or information for gaming machines, system equipment, casino personnel, and/or players registered within a gaming system, among other potential items. Files, data and other information on database 640 can be stored for backup purposes, and are preferably accessible to one or more system components, such as at a specially adapted gaming machine 100, 200, a general-purpose server 610, and/or a special purpose server 620, as desired. Database 640 is also preferably accessible by one or more of the peripheral devices on sub-network 630, such that information or data recorded on the database may be readily retrieved and reviewed at one or more of the peripheral devices, as desired. Although shown as directly connected to common bus 601, it is also contemplated that such a direct connection can be omitted and that only a direct connection to a server or other similar device be present in the event that heightened security with respect to data files is desired.

While gaming system 600 can be a system that is specially designed and created as new for use in a casino or gaming establishment implementing specialized gaming devices such as gaming machines 100, 200, it is also possible that many items in this system can be taken or adopted from an existing gaming system. For example, gaming system 600 could represent an existing player tracking system to which specialized gaming machines are added. Also, new functionality via software, hardware or otherwise can be provided to an existing database, 640, specialized server 620 and/or general server 610. In this manner, the methods and systems of the present invention may be practiced at reduced costs by gaming operators that already have existing gaming systems, such as a standard player tracking system, by simply modifying the existing system. Other modifications to an existing system may also be necessary, as might be readily appreciated.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming machine for playing a game and granting a payout based on the result of the game, comprising:

an input device configured to receive a wager;

an exterior housing arranged to contain a plurality of internal gaming machine components therein or thereabout;

a master gaming controller configured to control one or more aspects of said game that is played by using said wager, said master gaming controller configured to communicate instructions to at least one of said plurality of internal gaming machine components;

a memory hub in communication with said master gaming controller and configured to facilitate communications between said master gaming controller and one or more of said plurality of internal gaming machine components;

at least one Random Access Memory magnetoresistive storage device in communication with said memory hub and said master gaming controller, and configured to store gaming machine computer code thereupon; and at least one Read Only Memory magnetoresistive storage device having at least a portion thereof that can not be written to or have any code stored thereupon altered while installed within said gaming machine, said at least one Read Only Memory magnetoresistive storage device being in communication with said memory hub and said master gaming controller, and configured to store gaming machine computer code thereupon, wherein at least a portion of said at least one Read Only Memory magnetoresistive storage device contains computer code regarding at least one gaming machine program or process selected from the group consisting of: a specific game application, an operating system, a boot loader, a boot up process, an initialization process, an authentication process, a configuration process and a diagnostics process, and wherein one or more of said at least one Random Access Memory magnetoresistive storage device and said at least one Read Only Memory magnetoresistive storage device are configured to provide computer code stored thereupon to said master gaming controller at a rate faster than 8 MHz, wherein one of said at least one Read Only Memory magnetoresistive storage device is configured to store an initial basic input/output system (BIOS) and an extended BIOS, wherein said initial BIOS and said extended BIOS are configured to be executed by said master gaming controller to launch said game application, wherein said initial BIOS is configured to direct to said extended BIOS.

2. The gaming machine of claim 1, wherein one or more of said at least one Random Access Memory magnetoresistive storage device and said at least one Read Only Memory magnetoresistive storage device are configured to provide the computer code stored thereupon to said master gaming controller at a rate faster than 66 MHz.

3. The gaming machine of claim 2, wherein one or more of said at least one Random Access Memory magnetoresistive storage device and said at least one Read Only Memory magnetoresistive storage device are configured to provide the computer code stored thereupon to said master gaming controller at a rate faster than 133 MHz.

4. The gaming machine of claim 3, wherein one or more of said at least one Random Access Memory magnetoresistive storage device and said at least one Read Only Memory magnetoresistive storage device are configured to provide the computer code stored thereupon to said master gaming controller at a rate of about 800 MHz or faster.

5. The gaming machine of claim 1, wherein said unwritable and unalterable portion of said at least one Read Only Memory magnetoresistive storage device is rendered as unwritable and unalterable through a physical termination of a write connection to said unwritable and unalterable portion.

6. The gaming machine of claim 5, wherein said physical termination is made while gaming machine operational computer code is stored at said at least one Read Only Memory magnetoresistive storage device.

7. The gaming machine of claim 5, wherein said write connection includes a write pin to said at least one Read Only Memory magnetoresistive storage device.

8. The gaming machine of claim 7, wherein said at least one Read Only Memory magnetoresistive storage device is removably plugged into a socket within a printed circuit board, and wherein said write pin does not make an appropriate connection to any write device via said socket.

9. The gaming machine of claim 5, wherein said write connection is cut.

10. The gaming machine of claim 1, wherein one or more of said at least one Random Access Memory magnetoresistive storage device and said at least one Read Only Memory magnetoresistive storage device are in communication with said master gaming controller indirectly through said memory hub.

11. The gaming machine of claim 10, wherein substantially all communications with said at least one Read Only Memory magnetoresistive storage device are made through said memory hub, and wherein said unwritable and unalterable portion of said at least one Read Only Memory magnetoresistive storage device is rendered as unwritable and unalterable through one or more controls at said memory hub.

12. The gaming machine of claim 11, wherein said one or more controls result in the prevention of any communications along any write channel to said at least one Read Only Memory magnetoresistive storage device.

13. The gaming machine of claim 1, wherein said memory hub comprises at least one application specific integrated circuit.

14. The gaming machine of claim 13, wherein substantially all communications with said at least one Read Only Memory magnetoresistive storage device are made through said at least one application specific integrated circuit, and wherein said unwritable and unalterable portion of said at least one Read Only Memory magnetoresistive storage device is rendered as unwritable and unalterable through one or more controls at said at least one application specific integrated circuit.

15. The gaming machine of claim 1, further comprising a display monitor, wherein said gaming machine computer code stored in said at least one Random Access Memory magnetoresistive storage device is executed to display a view of said game on said display monitor.

16. The gaming machine of claim 1, wherein said input device comprises a coin acceptor, a bill validator, or a ticket validator.

17. The gaming machine of claim 1, wherein said initial BIOS and extended BIOS are configured to be stored in two separate read-only memory devices.

18. The gaming machine of claim 1, wherein said at least one Random Access Memory magnetoresistive storage device is configured to replace a hard drive portion and a non-volatile random access memory of said gaming machine.

19. The gaming machine of claim 1, wherein said at least one Read Only Memory magnetoresistive storage device is configured to replace a plurality of erasable programmable read-only memories of said gaming machine, wherein said erasable programmable read-only memories are configured to stored said initial BIOS and said extended BIOS.

20. A gaming system for accepting wagers, playing games based on the wagers and granting payouts based on the results of the games, comprising:

a plurality of input and output devices configured to accept the wagers, play games and grant payouts based on the results of the games;

a master gaming controller configured to control one or more aspects of said games and to communicate instructions to at least one of said plurality of input and output devices;

a memory hub in communication with said master gaming controller and configured to facilitate communications between said master gaming controller and one or more of said plurality of input and output devices;

at least one Random Access Memory magnetoresistive storage device in communication with said memory hub and said master gaming controller, and configured to store gaming machine computer code thereupon; and at least one Read Only Memory magnetoresistive storage device having at least a portion thereof that can not be written to or have any code stored thereupon altered while installed within said gaming system, said at least one Read Only Memory magnetoresistive storage device being in communication with said memory hub and said master gaming controller, and configured to store gaming system computer code thereupon, wherein at least a portion of said at least one Read Only Memory magnetoresistive storage device contains computer code regarding at least one gaming system program or process selected from the group consisting of a specific game application, an operating system, a boot loader, a boot up process, an initialization process, an authentication process, a configuration process and a diagnostics process, and wherein one or more of said at least one Random Access Memory magnetoresistive storage device and said at least one Read Only Memory magnetoresistive storage device are configured to provide computer code stored thereupon to said master gaming controller at a rate faster than 8 MHz, wherein one of said at least one Read Only Memory magnetoresistive storage device is configured to store an initial basic input/output system (BIOS) and an extended BIOS, wherein said initial BIOS and said extended BIOS are configured to be executed by said master gaming controller to launch said game application, wherein said initial BIOS is configured to direct to said extended BIOS.

21. The gaming system of claim 20, wherein one or more of said at least one Random Access Memory magnetoresistive storage device and said at least one Read Only Memory magnetoresistive storage device are configured to provide the computer code stored thereupon to said master gaming controller at a rate of about 800 MHz or faster.

22. The gaming system of claim 20, wherein said unwritable and unalterable portion of said at least one Read Only Memory magnetoresistive storage device is rendered as unwritable and unalterable through a physical termination of a write connection to said unwritable and unalterable portion.

23. The gaming system of claim 22, wherein said write connection includes a write pin to said at least one Read Only Memory magnetoresistive storage device, wherein said at least one Read Only Memory magnetoresistive storage device is removably plugged into a socket within a printed circuit board, and wherein said write pin does not make an appropriate connection to any write device via said socket.

24. The gaming system of claim 20, wherein one or more of said at least one Random Access Memory magnetoresistive storage device and said at least one Read Only Memory magnetoresistive storage device are in communication with said master gaming controller indirectly through said memory hub.

25. The gaming system of claim 24, wherein substantially all communications with said at least one Read Only Memory magnetoresistive storage device are made through said memory hub, and wherein said unwritable and unalterable portion of said at least one Read Only Memory magnetoresistive storage device is rendered as unwritable and unalterable through one or more controls at said memory hub.

26. The gaming system of claim 20, wherein said one or more controls result in the prevention of any communications along any write channel to said at least one Read Only Memory magnetoresistive storage device.

27. A gaming machine for playing a game and granting a payout based on the result of the game, comprising:

an input device configured to receive a wager;

an exterior housing arranged to contain a plurality of internal gaming machine components therein or thereabout;

a master gaming controller configured to control one or more aspects of said game that is played by using said wager, said master gaming controller configured to communicate instructions to at least one of said plurality of internal gaming machine components; and one or more magnetoresistive storage components in communication with said master gaming controller and configured to store gaming machine operational computer code thereupon, wherein said one or more magnetoresistive storage components are configured to provide said computer code stored thereupon to said master gaming controller at a rate faster than 8 MHz, and wherein at least a portion of said one or more magnetoresistive storage components comprises Read Only Memory that can not be written to or have any code stored thereupon altered while installed within said gaming machine, wherein said Read Only Memory is configured to store an initial basic input/output system (BIOS) and an extended BIOS, wherein said initial BIOS and said extended BIOS are configured to be executed by said master gaming controller to launch said game, wherein said initial BIOS is configured to direct to said extended BIOS.

28. The gaming machine of claim 27, wherein said at least a portion of said one or more magnetoresistive storage components comprising Read Only Memory contains computer code regarding at least one gaming machine program or process selected from the group consisting of: a specific game application, an operating system, a boot loader, a boot up process, an initialization process, an authentication process, a configuration process and a diagnostics process.

29. The gaming machine of claim 27, wherein said at least a portion of said one or more magnetoresistive storage components comprising Read Only Memory is configured to provide the computer code stored thereupon to said master gaming controller at a rate of about 800 MHz or faster.

30. The gaming machine of claim 27, wherein said unwritable and unalterable portion of said at least a portion of said one or more magnetoresistive storage components comprising Read Only Memory is rendered as unwritable and unalterable through a physical termination of a write connection to said unwritable and unalterable portion.

31. The gaming machine of claim 27, further including:

a memory hub in communication with said master gaming controller and configured to facilitate communications between said master gaming controller and one or more of said plurality of internal gaming machine components, wherein substantially all communications between said at least a portion of said one or more magnetoresistive storage components comprising Read Only Memory and said master gaming controller are made through said memory hub, and wherein said at least a portion of said one or more magnetoresistive storage components comprising Read Only Memory is rendered as unwritable and unalterable through one or more controls at said memory hub.

32. An electronic gaming machine for playing a game and granting a payout based on the result of the game, said electronic gaming machine comprising:

an input device configured to receive a wager;

an exterior housing arranged to contain a plurality of internal gaming machine components therein or thereabout;

a master gaming controller configured to control one or more aspects of said game that is played by using said wager, said master gaming controller configured to communicate instructions to at least one of said plurality of internal gaming machine components; and one or more storage components in communication with said master gaming controller and configured to store gaming machine operational computer code thereupon, wherein said one or more storage components are configured to provide said computer code stored thereupon to said master gaming controller at a rate faster than 8 MHz, and wherein at least a portion of said one or more storage components comprises Read Only Memory that can not be written to or have any code stored thereupon altered while installed within said gaming machine, wherein said Read Only Memory is configured to store an initial basic input/output system (BIOS) and an extended BIOS, wherein said initial BIOS and said extended BIOS are configured to be executed by said master gaming controller to launch said game, wherein said initial BIOS is configured to direct to said extended BIOS.

33. A method of operating a gaming machine, comprising:

effecting a power up or other reset condition of the gaming machine, said gaming machine configured to accept a wager, play a game based on the wager and grant a payout based on the result of the game;

detecting stored computer code for a gaming machine boot program or process at a Read Only Memory storage device associated with said gaming machine, said Read Only Memory storage device having at least a portion thereof that can not be written to or have any code stored thereupon altered while in active association with said gaming machine;

accessing an initial basic input/output operating system (BIOS) and an extended BIOS from said Read Only Memory storage device, wherein said initial BIOS is configured to direct to said extended BIOS;

executing said initial BIOS and said extended BIOS, wherein said executing said initial BIOS and said extended BIOS is performed by a master gaming controller of said gaming machine to launch said game;

reading said stored computer code from said Read Only Memory storage device at a rate faster than 8 MHz; and conducting a gaming machine boot process based only upon said reading of said stored computer code and without creating a copy of said stored computer code in any other storage device for purposes of said conducting step.

34. The method of claim 33, wherein said Read Only Memory storage device comprises a magnetoresistive storage device.

35. The method of claim 33, wherein said reading step is performed at a rate faster than 133 MHz.

36. The method of claim 35, wherein said reading step is performed at a rate of about 800 MHz or faster.

37. The method of claim 33, wherein said other reset condition of said gaming machine is selected from one or more items of the group consisting of: a power outage, a substantial electrostatic discharge, a critical hardware malfunction, a critical software malfunction, a gaming machine tilt and physical damage to a critical gaming machine component.

38. The method of claim 33, further including the step of:

authenticating said stored computer code.

39. The method of claim 38, wherein said authentication step includes creating a copy of said stored computer code at another storage device for authentication purposes only.

40. The method of operating a gaming machine, comprising:

effecting a power up or other reset condition of the gaming machine, said gaming machine configured to accept a wager, play a game based on the wager and grant a payout based on the result of the game;

detecting stored computer code for a gaming machine program or process at a Read Only Memory storage device associated with said gaming machine, said Read Only Memory storage device having at least a portion thereof that can not be written to or have any code stored thereupon altered while in active association with said gaming machine;

accessing an initial basic input/output operating system (BIOS) and an extended BIOS from said Read Only Memory storage device, wherein said initial BIOS is configured to direct to said extended BIOS;

executing said initial BIOS and said extended BIOS by a master gaming controller of said gaming machine to launch said game;

reading said stored computer code from said Read Only Memory storage device into said master gaming controller of said gaming machine at a rate faster than 66 MHz; and conducting one or more regular gaming machine operations based only upon said reading of said stored computer code into said master gaming controller and without reading a copy of said stored computer code into said master gaming controller from any other storage device for purposes of said conducting step.

41. The method of claim 40, wherein said Read Only Memory storage device comprises a magnetoresistive storage device.

42. The method of claim 40, wherein said reading step is performed at a rate of about 800 MHz or faster.

43. The method of claim 40, wherein said computer code for a gaming machine program or process is selected from the group consisting of: a specific game application, an operating system, a boot loader, a boot up process, an initialization process, an authentication process, a configuration process and a diagnostics process.

44. The method of claim 40, wherein at least one of said one or more regular gaming machine operations is selected from the group consisting of: making a meter change, providing a meter display, processing a game selection, processing a game play, determining a partial game outcome, determining a complete game outcome, providing a game display, providing a coin out, providing a cashless instrument out, making a machine yield calculation, providing an informational display and making a data communication.

45. A gaming machine for playing a game and granting a payout based on the result of the game, comprising:

an input device configured to accept a wager;

an exterior housing arranged to contain a plurality of internal gaming machine components therein or thereabout;

a master gaming controller configured to control one or more aspects of said game that is played by using said wager, said master gaming controller configured to communicate instructions to at least one of said plurality of internal gaming machine components;

a Read Only Memory magnetoresistive storage device configured to store an initial basic input/output system (BIOS) and an extended BIOS, wherein said initial BIOS and said extended BIOS are configured to be executed by said master gaming controller to launch said game, wherein said initial BIOS is configured to direct to said extended BIOS; and at least one peripheral device having a peripheral controller in communication with said master gaming controller and one or more magnetoresistive storage components in communication with said peripheral controller and configured to store peripheral operational code thereupon.

46. The gaming machine of claim 45, wherein said one or more magnetoresistive storage components are configured to provide said code stored thereupon to said peripheral controller at a rate faster than 8 MHz.

47. The gaming machine of claim 46, wherein said one or more magnetoresistive storage components are configured to provide said code stored thereupon to said peripheral controller a rate of about 800 MHz or faster.

48. The gaming machine of claim 45, wherein at least a portion of said one or more magnetoresistive storage components comprises Read Only Memory that can not be written to or have any code stored thereupon altered while installed within said gaming machine.

* * * * *